United States Patent
Ikeda et al.

(10) Patent No.: US 10,404,124 B2
(45) Date of Patent: Sep. 3, 2019

(54) ROTARY ELECTRIC MACHINE

(71) Applicant: MITSUBISHI ELECTRIC CORPORATION, Tokyo (JP)

(72) Inventors: Hiroko Ikeda, Tokyo (JP); Yu Hirotani, Tokyo (JP); Masatsugu Nakano, Tokyo (JP); Kazumasa Ito, Tokyo (JP); Kodai Okazaki, Tokyo (JP); Koji Kawamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/752,837

(22) PCT Filed: Sep. 16, 2016

(86) PCT No.: PCT/JP2016/077539
§ 371 (c)(1),
(2) Date: Feb. 14, 2018

(87) PCT Pub. No.: WO2017/073199
PCT Pub. Date: May 4, 2017

(65) Prior Publication Data
US 2018/0248432 A1 Aug. 30, 2018

(30) Foreign Application Priority Data
Oct. 28, 2015 (JP) .................. 2015-211873

(51) Int. Cl.
*H02K 3/00* (2006.01)
*H02K 3/28* (2006.01)
(Continued)

(52) U.S. Cl.
CPC ............ *H02K 3/28* (2013.01); *H02K 1/146* (2013.01); *H02K 1/274* (2013.01); *H02K 3/18* (2013.01);
(Continued)

(58) Field of Classification Search
CPC ...... H02K 3/18; H02K 3/522; H02K 2203/06; H02K 1/146
(Continued)

(56) References Cited

U.S. PATENT DOCUMENTS 6,998,750 B2 * 2/2006 Anma ...................... H02K 3/28
310/179
7,408,281 B2 * 8/2008 Kinashi .................. H02K 21/16
310/180
(Continued)

FOREIGN PATENT DOCUMENTS

DE   10 2011 078 157 A1    1/2013
EP      2 787 611 A1       10/2014
(Continued)

OTHER PUBLICATIONS

International Search Report dated Nov. 22, 2016 in PCT/JP2016/077539 filed Sep. 16, 2016.
(Continued)

*Primary Examiner* — Hanh N Nguyen
(74) *Attorney, Agent, or Firm* — Oblon, McClelland, Maier & Neustadt, L.L.P.

(57) ABSTRACT

A rotary electric machine includes: a rotor; and a stator including: a stator core; and an armature winding that is mounted to the stator core. The armature winding includes by a plurality of identical-phase winding portions in which identical-phase coil portions among coil portions in which conducting wires are wound in concentration onto respective teeth are connected together into a series circuit by crossover wires, and that also have lead wires at two end portions. Each of the lead wires of each of the identical-phase winding portions is led out in a first axial direction of the rotor from coil portions that have identical phase, that are disposed to be adjacent in a circumferential direction of the stator core; and all of the crossover wires of each of the identical-phase
(Continued)

winding portions are led out in a second axial direction of the rotor.

13 Claims, 26 Drawing Sheets

(51) Int. Cl.
*H02K 3/18* (2006.01)
*H02K 1/14* (2006.01)
*H02K 1/27* (2006.01)
*H02K 3/52* (2006.01)
*B62D 5/04* (2006.01)
*H02K 29/03* (2006.01)

(52) U.S. Cl.
CPC ........... *H02K 3/522* (2013.01); *B62D 5/0424* (2013.01); *B62D 5/0448* (2013.01); *H02K 29/03* (2013.01); *H02K 2203/06* (2013.01)

(58) Field of Classification Search
USPC .................................................. 310/179, 71
See application file for complete search history.

(56) References Cited

U.S. PATENT DOCUMENTS

2005/0189828 A1* 9/2005 Nakayama ........... B62D 5/0403
310/71
2005/0242677 A1 11/2005 Akutsu et al.
2007/0182271 A1 8/2007 Sugishima et al.

FOREIGN PATENT DOCUMENTS

| EP | 2 928 048 A1 | 10/2015 |
|---|---|---|
| JP | 2006-50690 A | 2/2006 |
| JP | 2006-191757 A | 7/2006 |
| JP | 2006-197674 A | 7/2006 |
| JP | 2007-215272 A | 8/2007 |
| JP | 2008-5603 A | 1/2008 |
| JP | 2010-193675 A | 9/2010 |
| JP | 2010-226899 A | 10/2010 |
| JP | 2014-107983 A | 6/2014 |
| WO | WO 2013/054439 A1 | 4/2013 |
| WO | WO 2013/080374 A1 | 6/2013 |
| WO | WO 2013/094075 A1 | 6/2013 |
| WO | WO 2017/073092 A1 | 5/2017 |
| WO | WO 2017/168574 A1 | 10/2017 |

OTHER PUBLICATIONS

Extended European Search Report dated May 28, 2019, in Patent Application No. 16859436.4, 8 pages.

* cited by examiner ature winding that is constituted by a plurality of identical-phase winding portions in which a plurality of identical-phase coil portions in which conducting wires are wound in concentration onto respective teeth are connected into a series circuit by means of crossover wires, and that also have lead wires at two end portions. -->

ROTARY ELECTRIC MACHINE

TECHNICAL FIELD

The present invention relates to a rotary electric machine that includes an armature winding that is constituted by a plurality of identical-phase winding portions in which a plurality of identical-phase coil portions in which conducting wires are wound in concentration onto respective teeth are connected into a series circuit by means of crossover wires, and that also have lead wires at two end portions.

BACKGROUND ART

Rotary electric machines are known that have an armature winding that has, among coil portions in which conducting wires are wound onto stator core teeth, at least two sets or more at positions at which identical-phase coil portions that are disposed so as to be circumferentially adjacent, and these pairs of circumferentially adjacent identical-phase coil portions are connected to the same series circuit, and in order to reduce the number of connections and to make crossover wires shorter, the conducting wires are wound successively onto the teeth of other phases, and in which delta connections are configured by connecting lead wires of different phases that are adjacent to each other (see Patent Literature 1, for example).

Motors are also known that include an armature winding in which pairs of circumferentially adjacent identical-phase coil portions are connected to different series circuits than each other in order to suppress increases in the number of parts, and in which parallel circuits are configured by connecting lead wires of these pairs of circumferentially adjacent identical-phase coil portions (see Patent Literature 2, for example).

CITATION LIST

Patent Literature

[Patent Literature 1]
 Japanese Patent Laid-Open No. 2006-191757 (Gazette)
[Patent Literature 2]
 Japanese Patent Laid-Open No. 2010-193675 (Gazette)

SUMMARY OF THE INVENTION

Problem to be Solved by the Invention

However, in the rotary electric machine that is described in Patent Literature 1, since identical-phase coil portions on the same circuit are connected at an opposite end from electric power supplying portions, some problems have been that axial length of the stator of the rotary electric machine is increased, and winding operations are also made difficult, making manufacturability poor.

Since adjacent pairs of identical-phase coil portions are connected into the same series circuits, crossover wires are required when configuring the parallel circuits to connect the identical-phase coil portions that are connected to the series circuits that are different than each other in parallel, and one problem has been that the axial length of the stator of the rotary electric machine is further increased, making manufacturability poor.

In the motor that is described in Patent Literature 2, identical-phase coil portions on the same circuit are connected at both an opposite end from electric power supplying portions and an end near the electric power supplying portions, shortening the axial length of the stator, but because not only the coil portions that are wound onto the teeth, but also different-phase crossover wires are disposed inside a single slot, one problem has been that workability of the windings is poor.

The present invention aims to solve the above problems and an object of the present invention is to provide a rotary electric machine that reduces size by shortening an axial length of a stator, and in which workability of windings is also improved.

Means for Solving the Problem

A rotary electric machine according to the present invention includes: a rotor that includes a plurality of magnetic poles; and a stator that is disposed so as to surround the rotor, the stator including: a stator core; and an armature winding that is mounted to the stator core, wherein: the stator core includes: an annular core back; and a plurality of teeth that extend from the core back in a radially inward direction of the rotor; the armature winding is constituted by a plurality of identical-phase winding portions; each of the identical-phase winding portions includes a plurality of coil portions that have identical phase; the plurality of coil portions are configured such that a conducting wire is wound in concentration onto each of the plurality of teeth; a plurality of coil portions that have identical phase are connected in series by means of crossover wires in each of the identical-phase winding portions; a plurality of lead wires are respectively led out from each of the identical-phase winding portions; the coil portion from which the lead wire is led out in a first identical-phase winding portion among a mutually different pair of the identical-phase winding portions constitutes a first coil portion, and the coil portion from which the lead wire is led out in a second identical-phase winding portion constitutes a second coil portion; a phase of the first coil portion is an identical phase to a phase of the second coil portion; the first coil portion is disposed so as to be adjacent to the second coil portion in a circumferential direction of the stator core; each of the lead wires of each of the identical-phase winding portions is led out in a first axial direction of the rotor; and all of the crossover wires of each of the identical-phase winding portions are led out in a second axial direction of the rotor.

Effects of the Invention

According to the rotary electric machine according to the present invention, because the respective lead wires of each of the identical-phase winding portions are led out in a first axial direction of the rotor from identical-phase coil portions that are disposed so as to be adjacent in a circumferential direction of the stator core, and the crossover wires are led out in a second axial direction of the rotor, connection of the windings is facilitated since positions where crossover wires intersect, or where crossover wires are led around in the circumferential direction can be reduced, improving manufacturability, and the rotary electric machine can also be reduced in size since a stator axial length L can be shortened.

Space factor is also improved since different-phase crossover wires do not coexist inside slots between adjacent teeth.

DESCRIPTION OF EMBODIMENTS

Respective embodiments of the electric motor according to the present invention will now be explained with reference to the drawings, and identical or corresponding members and portions in each of the embodiments will be explained using identical numbering.

Embodiment 1

Figure 1:
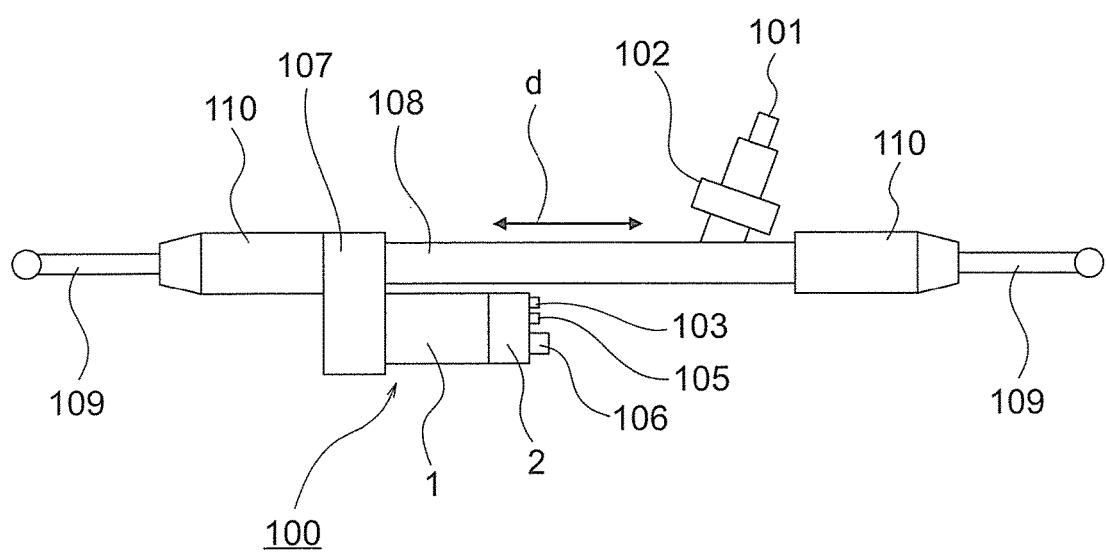
FIG. 1 is a configuration diagram that shows a configuration of an automotive electric power steering apparatus to which an electric motor according to Embodiment 1 of the present invention is mounted.
Figure 2:
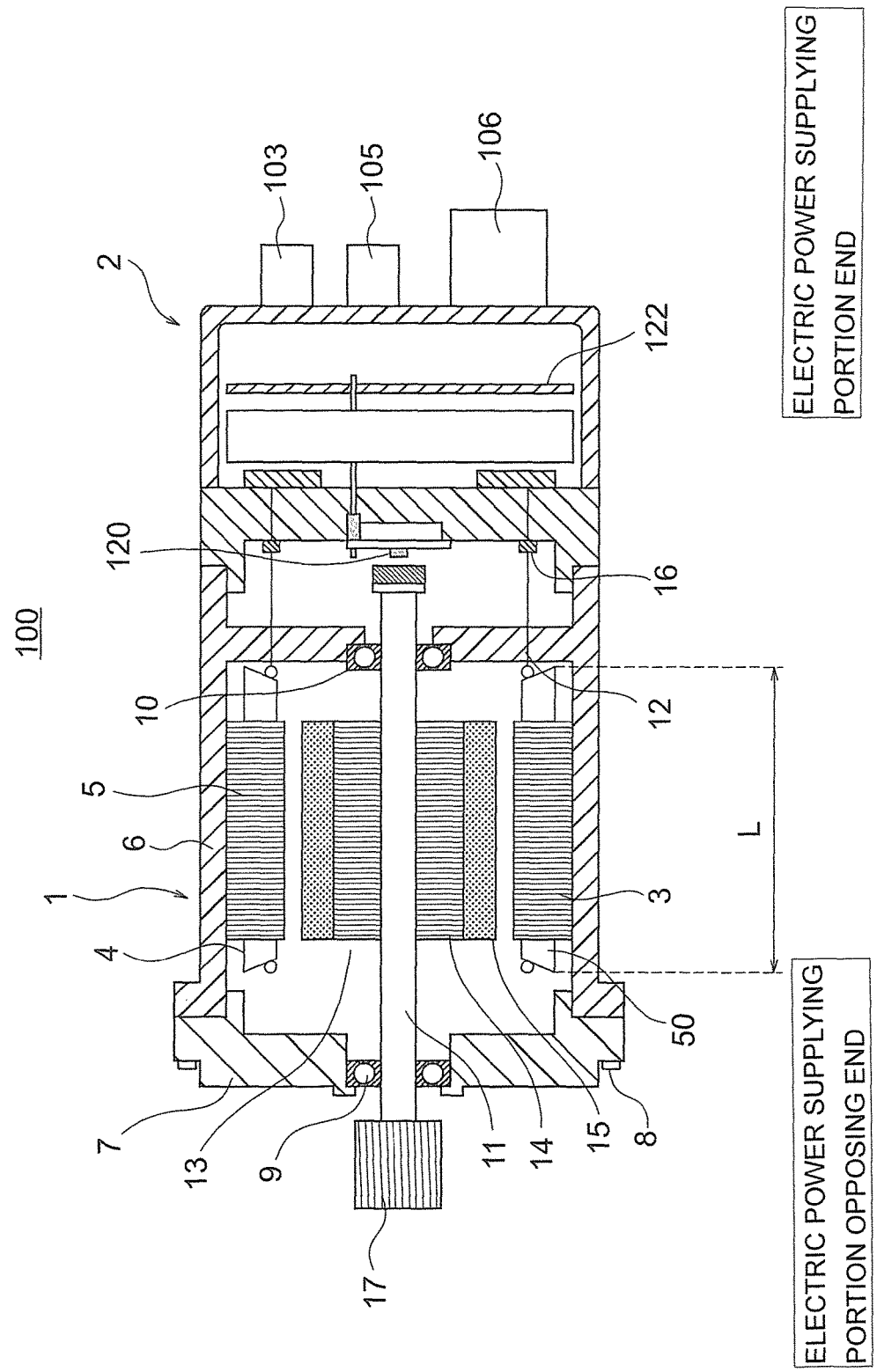
FIG. 2 is a cross section that shows an electric driving apparatus from FIG. 1.
Figure 3:
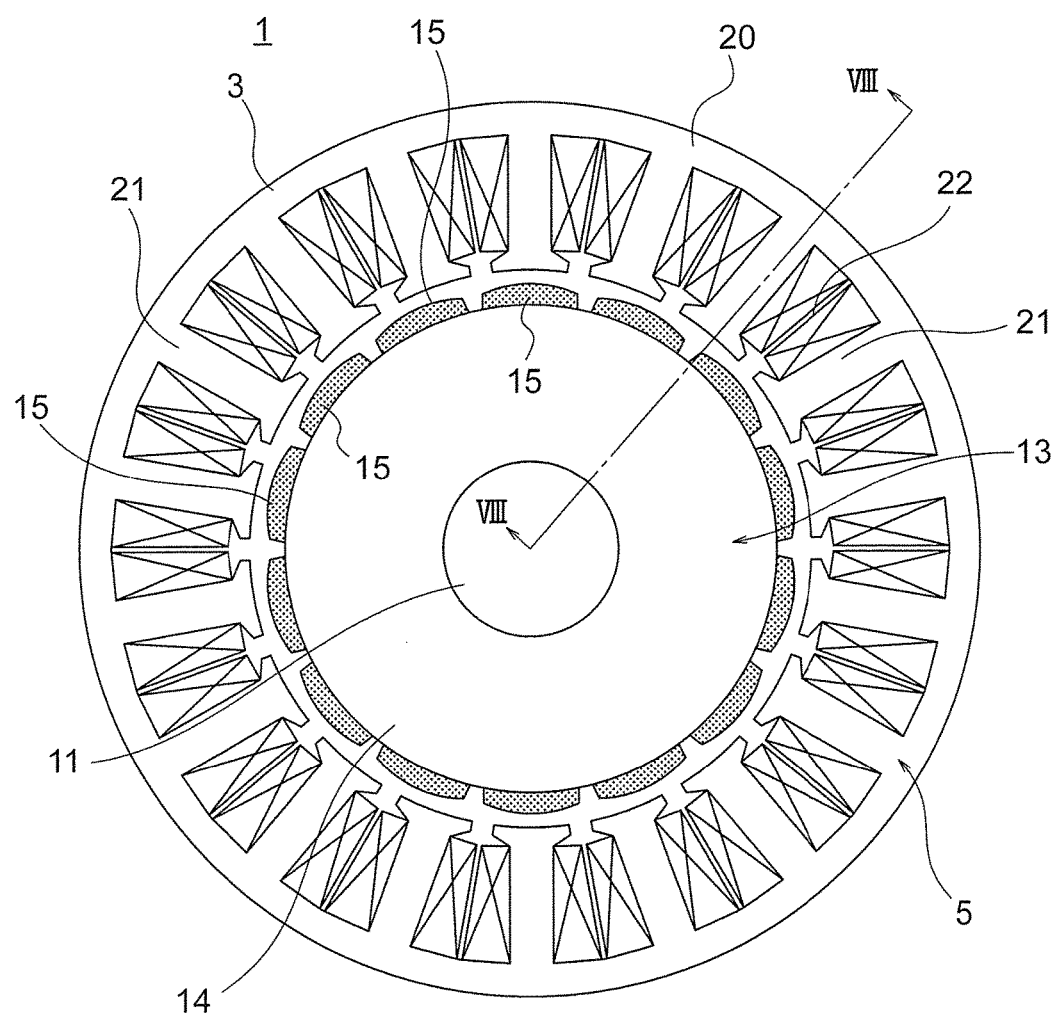
FIG. 3 is a frontal cross section that shows the electric motor from FIG. 2.
Figure 4:
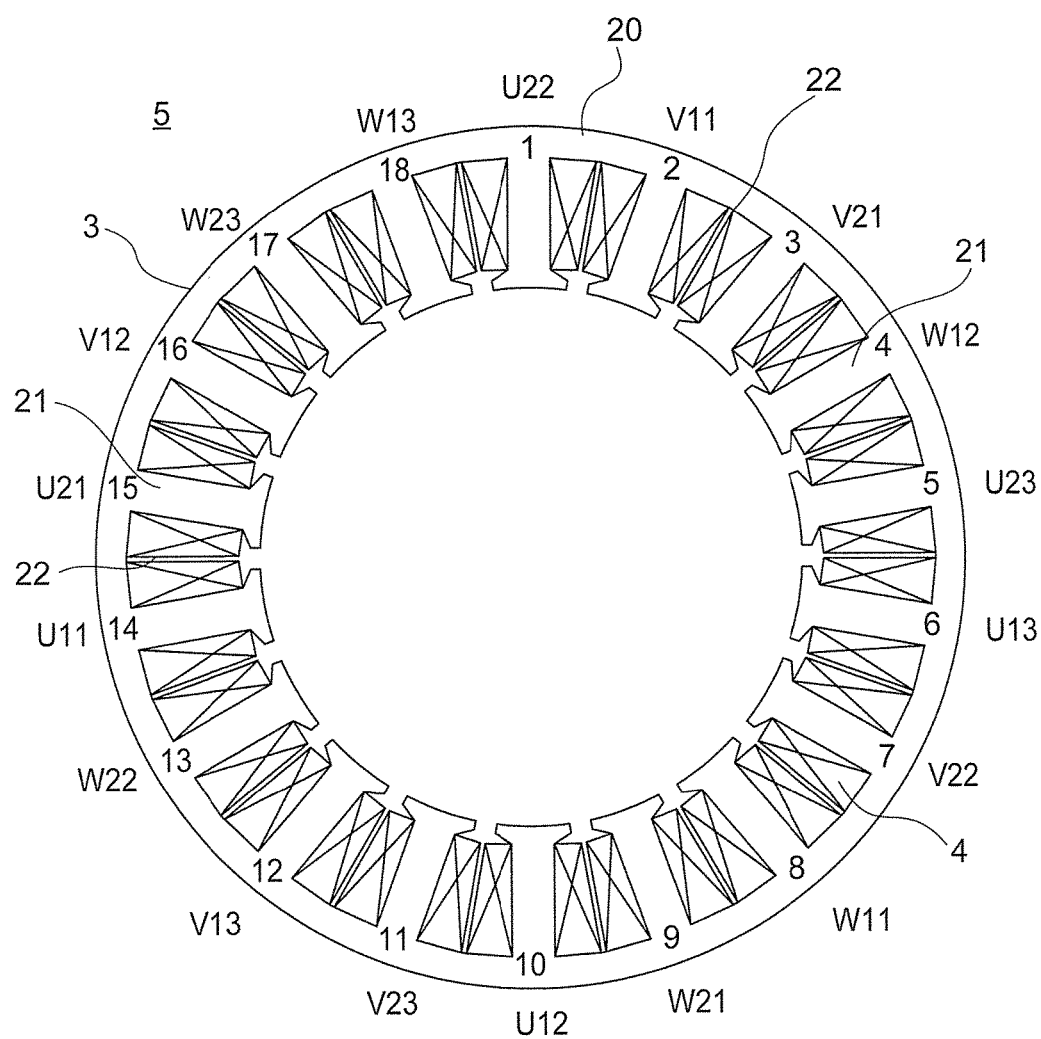
FIG. 4 is a frontal cross section that shows a stator from FIG. 3.

FIG. 1 is a configuration diagram that shows an automotive electric power steering apparatus to which an electric motor 1 according to Embodiment 1 of the present invention is mounted, FIG. 2 is a cross section that shows an electric driving apparatus 100 from FIG. 1, FIG. 3 is a frontal cross section that shows the electric motor 1 from FIG. 2, and FIG. 4 is a frontal cross section that shows a stator 5 from FIG. 3.

This electric power steering apparatus includes: an electric motor 1 that constitutes a rotary electric machine; and an electric driving apparatus 100 that is constituted by an electric control unit 2 (ECU) 2.

In this electric power steering apparatus, a driver steers a steering wheel (not shown), and torque therefrom is transmitted to a shaft 101 by means of a steering column (not shown). Here, torque that is detected by a torque sensor 102 is converted into electrical signals, which are transmitted through cables (not shown) to the ECU 2 by means of a first connector 103.

At the same time, vehicle information such as vehicle speed is converted to electrical signals, which are transmitted to the ECU 2 through a second connector 105. The ECU 2 computes the required assisting torque from this torque and the vehicle information such as the vehicle speed, and supplies electric current through an inverter to the electric motor 1 that is arranged so as to be parallel to a rack shaft (not shown) inside a housing 108.

Electric power supply to the ECU 2 is fed by means of an electric power supply connector 106 from a battery or an alternator.

Torque that is generated by the electric motor 1 is made to generate thrust that moves the rack shaft in the direction of the arrows d to assist the steering force of the driver by being reduced by a gear box 107 into which belts (not shown) and ball screws (not shown) are mounted internally.

Tie rods 109 thereby move, enabling the tires to be steered and the vehicle turned.

As a result, the driver is assisted by the torque of the electric motor 1, and can turn the vehicle using a reduced steering force.

Moreover, a rack boot 110 is disposed so as to prevent foreign matter from entering the apparatus.

The electric motor 1 of the electric driving apparatus 100 includes: a stator 5; a cylindrical frame 6, the stator 5 being fixed to an inner wall surface of the cylindrical frame 6; a housing 7 that is fixed by a plurality of bolts 8 so as to cover an opening portion at one end of the frame 6; and a rotor 13.

The stator 5 has: a stator core 3 that is configured by laminating core sheets of a magnetic body such as electromagnetic steel sheets, etc. and an armature winding 4 that is housed in this stator core 3.

The rotor 13 has: a shaft 11, two end portions thereof being supported by a first bearing 9 that is fitted into the housing 7 and a second bearing 10 that is fitted into a wall portion 12; a rotor core 14 through which the shaft 11 passes; and fourteen permanent magnets 32 that are glued to this rotor core 14 at a uniform spacing circumferentially.

Moreover, although omitted from FIGS. 2 and 3, an outer side of the permanent magnets 15 may be covered by a cover in which a nonmagnetic material such as a stainless alloy or aluminum is made into a cylindrical shape to protect and prevent scattering of the permanent magnets 15.

The ECU 2 of the electric driving apparatus 100 has electric power supplying portions 16 that are connected to the armature winding 4, and the rotor 13 rotates due to three-phase alternating current that includes a U phase, a V phase, and a W phase being supplied to the armature winding 4 through the electric power supplying portions 16.

Hereafter, in the electric motor 1, an end that is connected to the electric power supplying portions 16, i.e., an end near the ECU 2, will be called an "electric power supplying portion end" of the armature winding 4, and an opposite end from the electric power supplying portions 16, i.e., an end near the pulley 17, will be called an "electric power supplying portion opposing end" of the armature winding 4.

Moreover, in the above electric driving apparatus 100, the electric motor 1 and the ECU 2 are integrated so as to be disposed in an axial direction of the shaft 11, but are not limited thereto, and the ECU 2 may be disposed in a radial direction of the electric motor 1, or the electric motor 1 and the ECU 2 may be separate.

Here, a length from a first end surface of a coil end 50 or a crossover wire of the electric motor 1 to a second end surface of a coil end 50 or a crossover wire will be called a stator axial length L.

A length of the electric motor 1 is shortened by shortening this stator axial length L, thereby also shortening an axial length of the electric driving apparatus 100.

The stator core 3 of the stator 5 has: an annular core back 20; and teeth 21 that extend radially inward from the core back 20 at eighteen positions, slots 22 being formed between adjacent teeth 21.

The armature winding 4 of the stator 5 is configured by winding conducting wires onto each of the teeth 21 in concentration.

Moreover, insulators that are disposed between the armature winding 4 and the stator core 3 are omitted from FIGS. 3 and 4 for simplicity. Numbers 1 through 18 are also allocated to the teeth 21 in FIG. 4 for convenience.

The conducting wires that are wound in concentration onto each of the teeth 21 of the armature winding 4 will hereafter be called "coil portions".

In FIG. 4, numbering is applied to the coil portions that are disposed on each of the teeth 21 for convenience so that it is clear to which of the three phases, i.e., U, V, or W, each coil portion belongs.

The U phase is constituted by six coils portions, i.e., U11, U12, U13, U21, U22, and U23, the V phase is constituted by six coils portions, i.e., V11, V12, V13, V21, V22, and V23, and the W phase is constituted by six coils portions, i.e., W11, W12, W13, W21, W22, and W23, and as shown in FIG. 4, the respective coil portions are disposed so as to line up in order of U22, V11, V21, W12, U23, V13, V22, W11, W21, U12, V23, V13, W22, U11, U21, V12, W23, and W13 in a clockwise direction so as to correspond to each of Numbers 1 through 18 of the teeth 21.

Figure 5:
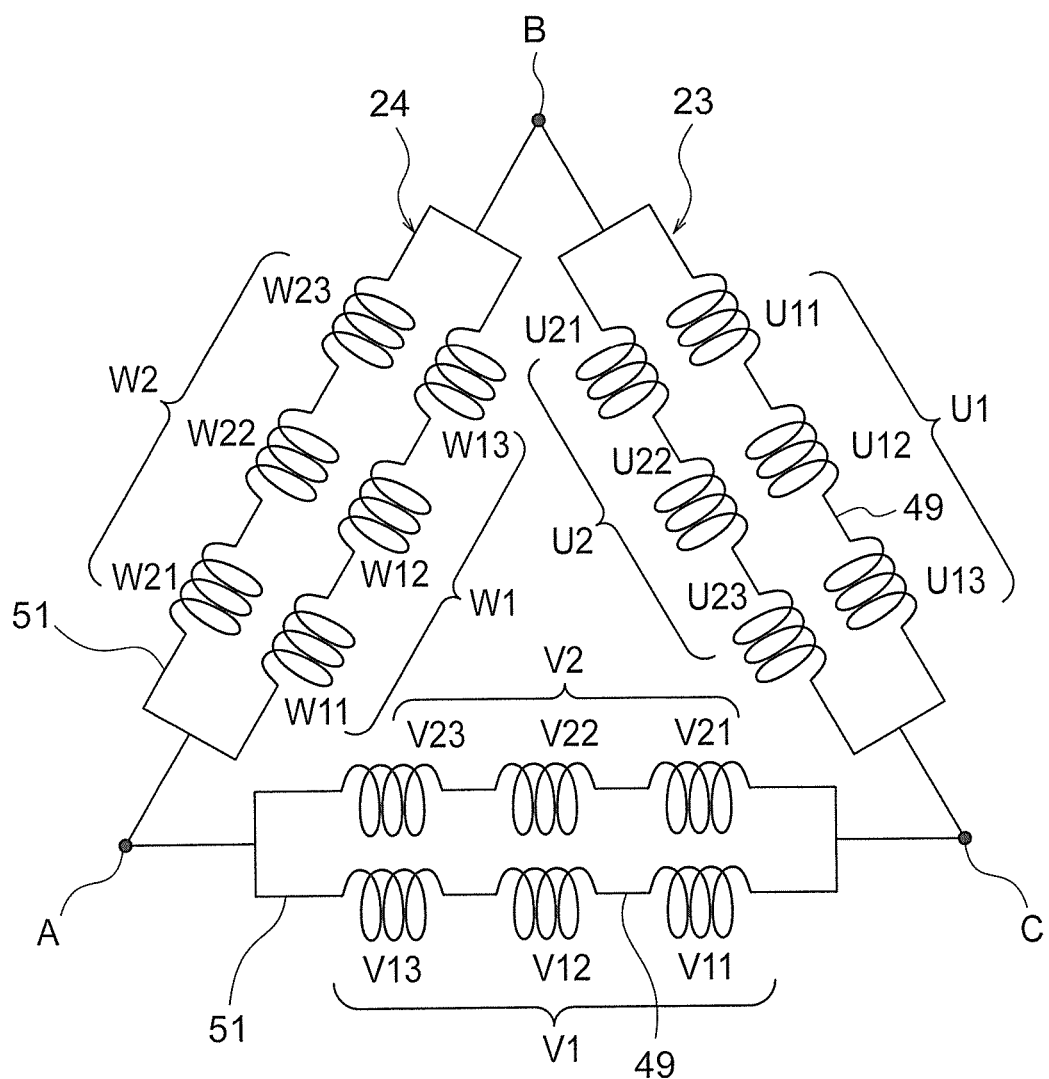
FIG. 5 is a circuit diagram that shows an armature winding from FIG. 4.

FIG. 5 is a winding circuit diagram that shows the armature winding 4 of the electric motor 1.

The armature winding 4 is constituted by a first armature winding portion 23 and a second armature winding portion 24.

The first armature winding portion 23 is constituted by a first U-phase winding portion U1, a first V-phase winding portion V1, and a first W-phase winding portion W1. The first U-phase winding portion U1 is an identical-phase winding portion in which U11, U12, and U13, which are identical-phase coil portions, are connected in series. The first V-phase winding portion V1 is an identical-phase winding portion in which V11, V12, and V13, which are identical-phase coil portions, are connected in series. The first W-phase winding portion W1 is an identical-phase winding portion in which W11, W12, and W13, which are identical-phase coil portions, are connected in series.

The second armature winding portion 24 is constituted by a second U-phase winding portion U2, a second V-phase winding portion V2, and a second W-phase winding portion W2. The second U-phase winding portion U2 is an identical-phase winding portion in which U21, U22, and U23, which are identical-phase coil portions, are connected in series. The second V-phase winding portion V2 is an identical-phase winding portion in which V21, V22, and V23, which are identical-phase coil portions, are connected in series. The second W-phase winding portion W2 is an identical-phase winding portion in which W21, W22, and W23, which are identical-phase coil portions, are connected in series.

The respective coil portions U11, U12, U13, U21, U22, U23, V11, V12, V13, V21, V22, V23, W11, W12, W13, W21, W22, and W23, where adjacent, are connected together by means of crossover wires 49, and respective lead wires 51 lead out from two end portions of each of the identical-phase winding portions U1, U2, V1, V2, W1, and W2.

The first U-phase winding portion U1 and the second U-phase winding portion U2 are connected into a parallel circuit by means of the lead wires 51, the first V-phase winding portion V1 and the second V-phase winding portion V2 are connected into a parallel circuit by means of the lead wires 51, and the first W-phase winding portion W1 and the second W-phase winding portion W2 are connected into a parallel circuit by means of the lead wires 51.

The armature winding 4 is connected at delta-connection connecting portions A, B, and C to form a delta connection.

Figure 6:
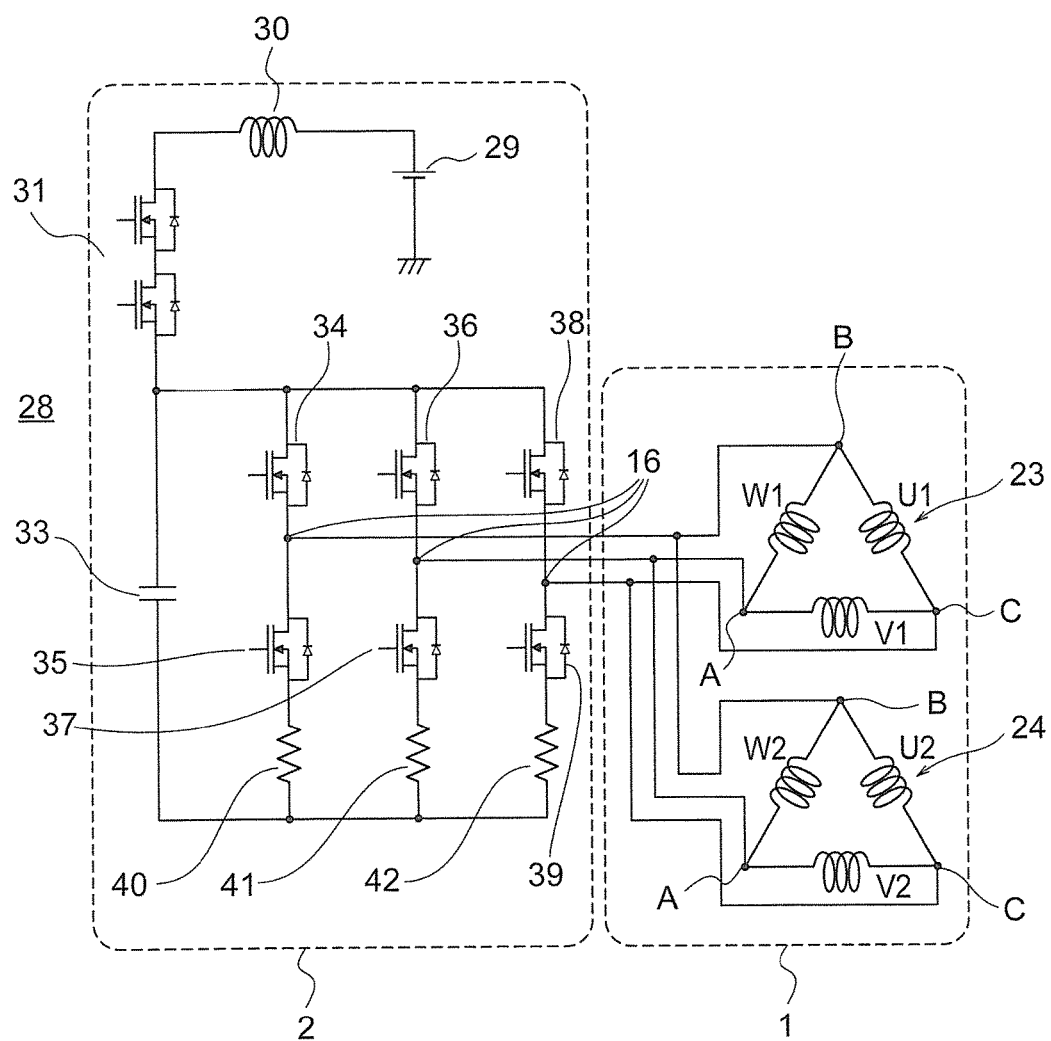
FIG. 6 is a circuit diagram that shows an electric motor and an ECU from FIG. 2.

FIG. 6 is a circuit diagram for the electric motor 1 and the ECU 2.

Moreover, only the armature winding 4 is shown in the electric motor 1.

Only a power circuit portion of the inverter 28 is shown in the ECU 2.

The ECU 2 is constituted by a circuit of the single inverter 28, and three-phase electric current is supplied to both the first armature winding portion 23 and the second armature winding portion 24 from this inverter 28.

A direct-current power source is supplied to the ECU 2 from a power source 29 such as a battery, which is connected to an electric power supply relay 31 so as to have a noise reduction coil 30 interposed.

Moreover, in FIG. 6, the power source 29 is depicted as if it were inside the ECU 2, but in fact electric power is supplied from an external power source such as a battery through a connector.

One electric power supply relay 31 that is constituted by two MOSFETs is disposed, and operates such that the electric power supply relay 31 opens during failure, to prevent excessive electric current from flowing.

In FIG. 6, connection is made sequentially in order of the power supply 29, the coil 30, and the electric power supply relay 31, but it goes without saying that the electric power supply relay 31 may be disposed at a position that is closer to the power supply 29 than the coil 30.

Moreover, a capacitor 33 is a smoothing capacitor.

In FIG. 6, this is constituted by a single capacitor 33, but it goes without saying that it may be configured by connecting a plurality of capacitors in parallel.

The inverter 28 is constituted by a bridge that uses six MOSFETs, a first MOSFET 34 and a second MOSFET 35 being connected in series, a third MOSFET 36 and a fourth MOSFET 37 being connected in series, a fifth MOSFET 38 and a sixth MOSFET 39 being connected in series, and these three sets of MOSFETs being further connected in parallel. In addition, a first shunt 40, a second shunt 41, and a third shunt 42 that are used in the detection of electric current values are respectively connected to a ground (GND) side of each of the three lower MOSFETs, i.e., the second MOSFET 35, the fourth MOSFET 37, and the sixth MOSFET 39. Moreover, an example is shown in which there are three shunts 40, 41, and 42, but since electric current detection is possible even if there are two shunts, or even if there is a single shunt, it goes without saying that such configurations are also possible.

Supply of electric current to the electric motor 1, as shown in FIG. 6, is respectively supplied from between the first MOSFET 34 and the second MOSFET 35 through an electric power supplying portion 16 to a first U-phase winding portion U1 and a second U-phase winding portion U2 of the electric motor 1, from between the third MOSFET 36 and the fourth MOSFET 37 through an electric power supplying portion 16 to a first V-phase winding portion V1 and a second V-phase winding portion V2 of the electric motor 1, and from between the fifth MOSFET 38 and the sixth MOSFET 39 through an electric power supplying portion 16 to a first W-phase winding portion W1 and a second W-phase winding portion W2 of the electric motor 1.

Electrically connected positions between the electric motor 1 and the ECU 2 are at three positions in total for three phases, but are divided into the first armature winding portion 23 and the second armature winding portion 24 inside the electric motor 1.

When the phase currents of the electric motor 1 are large, wire diameter of the coils increases excessively if the number of parallel circuits is reduced, greatly reducing workability when winding the concentrated windings onto the teeth 21.

However, since the armature winding 4 according to Embodiment 1 is constituted by parallel circuits, i.e., the first armature winding portion 23 and the second armature winding portion 24, wire diameter in the coils can be reduced compared to the case of a single armature winding.

For example, since conducting wires that are approximately 1 mm in diameter can be used in an electric motor 1 in which the diameter of the stator core 3 is approximately 80 to 90 mm, one effect is that winding workability is increased, making it suitable for mass production.

Figure 7:
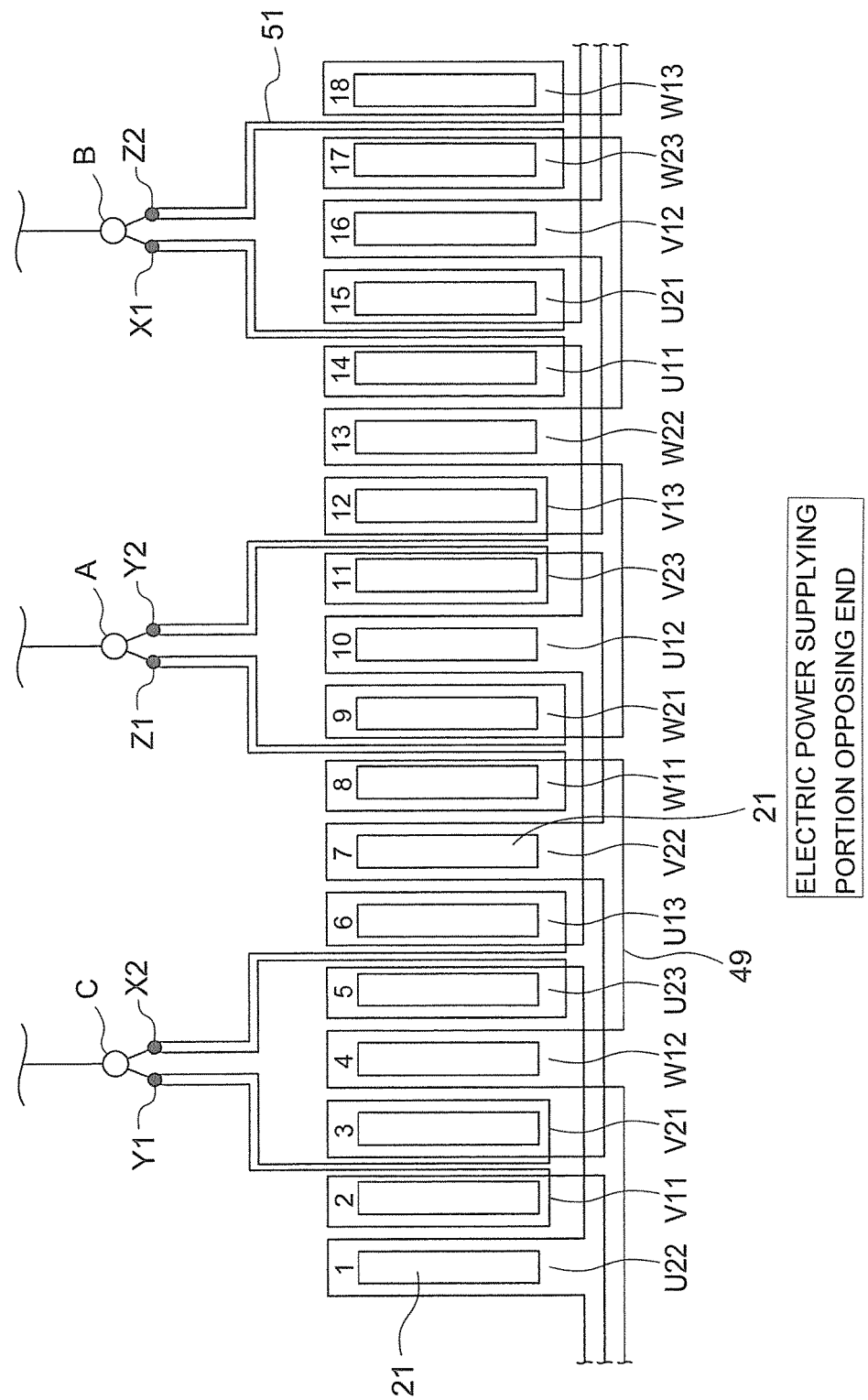
FIG. 7 is a connection explaining diagram for the armature winding of the electric motor from FIG. 1.

FIG. 7 is a connection explaining diagram for the armature winding 4, being a diagram that shows how the eighteen coil portions U11, U12, U13, U21, U22, U23, V11, V12, V13, V21, V22, V23, W11, W12, W13, W21, W22, and W23 are electrically connected.

The row of eighteen quadrangular shapes represents the teeth 21 from Numbers 1 through 18.

The coil portions U11, U12, and U13 are connected consecutively in series to constitute the first U-phase winding portion U1. Here, the winding direction of the conducting wire in U12 is in an opposite direction to that of U11 and U13. The coil portions U21, U22, and U23 are connected consecutively in series to constitute the second U-phase winding portion U2. Here, the winding direction of the conducting wire in U22 is in an opposite direction to that of U21 and U23. The coil portions V11, V12, and V13 are connected consecutively in series to constitute the first V-phase winding portion V1. Here, the winding direction of the conducting wire in V12 is in an opposite direction to that of V11 and V13. The coil portions V21, V22, and V23 are connected consecutively in series to constitute the second V-phase winding portion V2. Here, the winding direction of the conducting wire in V22 is in an opposite direction to that of V21 and V23. The coil portions W11, W12, and W13 are connected consecutively in series to constitute the first W-phase winding portion W1. Here, the winding direction of the conducting wire in W12 is in an opposite direction to that of W11 and W13. The coil portions W21, W22, and W23 are connected consecutively in series to constitute the second W-phase winding portion W2. Here, the winding direction of the conducting wire in W22 is in an opposite direction to that of W21 and W23.

If this configuration is adopted, the three identical-phase coil portions in each series circuit are configured such that a conducting wire skips three teeth 21 in a first direction and is wound onto a fourth tooth 21, enabling effects to be obtained such as enabling the crossover wires 49 between adjacent identical-phase coil portions to be made shorter, enabling electrical resistance to be reduced.

In the electric motor 1 according to Embodiment 1, each of the identical-phase coil portions of pairs of identical-phase winding portions are disposed so as to be adjacent in a circumferential direction of the stator core 3, and the coil portions of the respective identical-phase winding portions are respectively disposed on the fourth teeth 21 clockwise and counterclockwise around the stator core 3 so as to skip three teeth 21.

In FIG. 4, the coil portion U11 of the first U-phase winding portion U1 at Number 14 is connected to both U12 at Number 10 and U13 at Number 6 continuously by means of crossover wires 49. The coil portion U21 of the second U-phase winding portion U2 at Number 15, which is adjacent to U11, is connected to both U22 at Number 1 and U23 at Number 5 continuously by means of crossover wires 49.

The coil portion V11 of the first V-phase winding portion V1 at Number 2 is connected to both V12 at Number 16 and V13 at Number 12 continuously by means of crossover wires 49. The coil portion V21 of the second V-phase winding portion V2 at Number 3, which is adjacent to V11, is connected to both V22 at Number 7 and V23 at Number 11 continuously by means of crossover wires 49.

The coil portion W11 of the first W-phase winding portion W1 at Number 8 is connected to both W12 at Number 4 and W13 at Number 18 continuously by means of crossover wires 49. The coil portion W21 of the second W-phase winding portion W2 at Number 9, which is adjacent to W11, is connected to both W22 at Number 13 and W23 at Number 17 continuously by means of crossover wires 49.

In the first U-phase winding portion U1, lead wires 51 that are led out from U11 and U13 are led out in a first axial direction, and U11, U12, and U13 are connected consecutively by means of crossover wires 49 in a second axial direction. Similarly, in the second U-phase winding portion U2, lead wires 51 that are led out from U21 and U23 are led out in the first axial direction, and U21, U22, and U23 are connected consecutively by means of crossover wires 49 in the second axial direction.

In the first V-phase winding portion V1, lead wires 51 that are led out from V11 and V13 are led out in the first axial direction, and V11, V12, and V13 are connected consecutively by means of crossover wires 49 in the second axial direction. Similarly, in the second V-phase winding portion V2, lead wires 51 that are led out from V21 and V23 are led out in the first axial direction, and V21, V22, and V23 are connected consecutively by means of crossover wires 49 in the second axial direction.

In the first W-phase winding portion W1, lead wires 51 that are led out from W11 and W13 are led out in the first axial direction, and W11, W12, and W13 are connected consecutively by means of crossover wires 49 in the second axial direction. Similarly, in the second W-phase winding portion W2, lead wires 51 that are led out from W21 and W23 are led out in the first axial direction, and W21, W22, and W23 are connected consecutively by means of crossover wires 49 in the second axial direction.

In this manner, in the electric motor 1 according to Embodiment 1, twelve lead wires 51 emerge in the first axial direction from the electric motor 1 as a whole, from the winding start and the winding finish of the conducting wires of the respective first and second phase winding portions U1, U2, V1, V2, W1, and W2 that are constituted by each of the series circuits.

The configuration is such that, among the coil portions that are mounted to the stator core 3, the lead wires 51 emerge from positions at which pairs of identical-phase coil portions are adjacent to each other in a circumferential direction, namely U11 and U21, U13 and U23, V11 and V21, V13 and V23, W11 and W21, and W13 and W23. In other words, among mutually different pairs of identical-phase winding portions U1 and U2, V1 and V2, and W1 and W2, the coil portions U11, U13, V11, V13, W11, and W13 from which the lead wires 51 are led out in the first identical-phase winding portions U1, V1, and W1 are first coil portions, the coil portions U21, U23, V21, V23, W21, and W23 from which the lead wires 51 are led out in the second identical-phase winding portions U2, V2, and W2 are second coil portions, and the first coil portions are disposed so as to be adjacent to the second coil portions in the circumferential direction of the stator core 3. Furthermore, the phases of the first coil portions are identical phases to the phases of the second coil portions that are disposed so as to be adjacent to the first coil portions. The crossover wires 49 that connect the identical-phase winding portions, on the other hand, are led out in the second axial direction.

In FIG. 7, X1 is a parallel circuit connecting portion that connects the circumferentially adjacent U11 and U21. Similarly, X2 is a parallel circuit connecting portion that connects the circumferentially adjacent U13 and U23.

Y1 is a parallel circuit connecting portion that connects the circumferentially adjacent V11 and V21. Similarly, Y2 is a parallel circuit connecting portion that connects the circumferentially adjacent V13 and V23.

Z1 is a parallel circuit connecting portion that connects the circumferentially adjacent W11 and W21. Similarly, Z2 is a parallel circuit connecting portion that connects the circumferentially adjacent W13 and W23.

The electric motor 1 according to Embodiment 1 is a three-phase two-parallel electric motor 1 that has six parallel circuit connecting portions X1, X2, Y1, Y2, Z1, and Z2.

The armature winding 4 is configured into a delta connection by connecting circumferentially adjacent different-phase parallel circuit connecting portions X1, X2, Y1, Y2, Z1, and Z2 among these six parallel circuit connecting portions X1, X2, Y1, Y2, Z1, and Z2.

The electric motor 1 according to Embodiment 1 is driven by supplying electric power from external electric power supplying portions 16 to each of these delta-connection connecting portions A, B, and C.

Moreover, in this case, the electric power supplying portions 16 are separate members from the parallel circuit connecting portions X1, X2, Y1, Y, Z1, and Z2 and the delta-connection connecting portions A, B, and C, but the electric power supplying portions 16 may serve as parallel circuit connecting portions or delta-connection connecting portions, or may serve as both.

Figure 8:
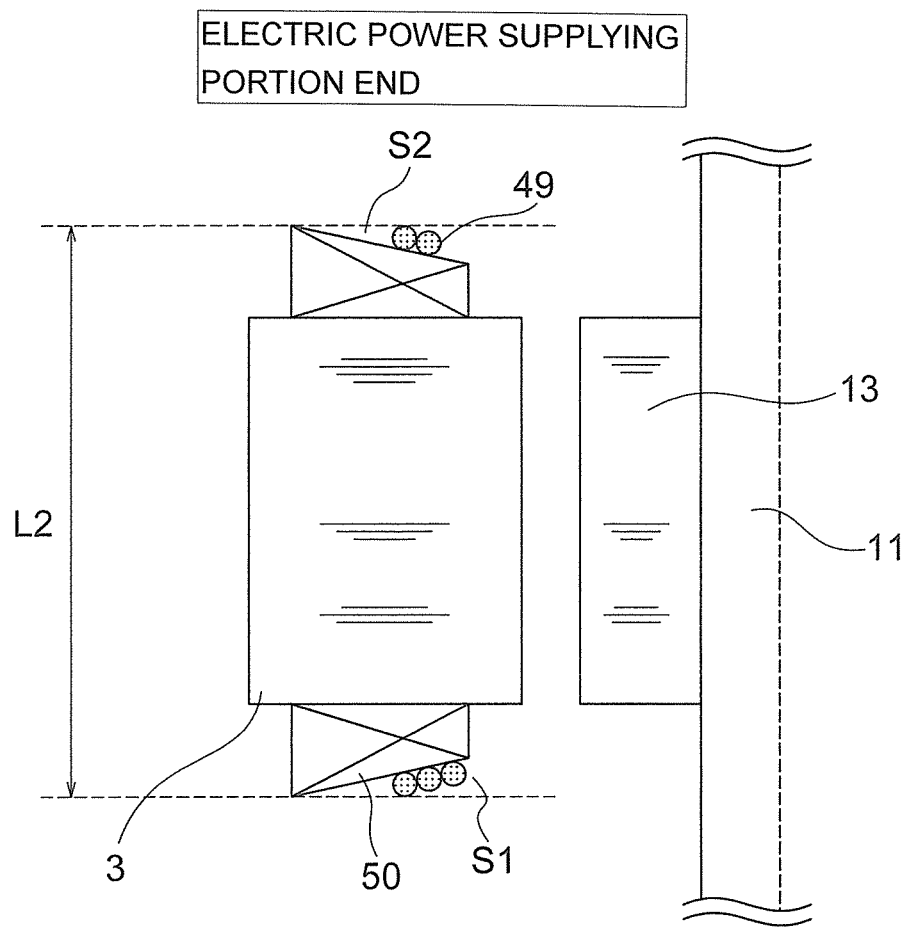
FIG. 8 is a cross section that is taken along Line VIII-VIII in FIG. 3 so as to be viewed in the direction of the arrows.
Figure 9:
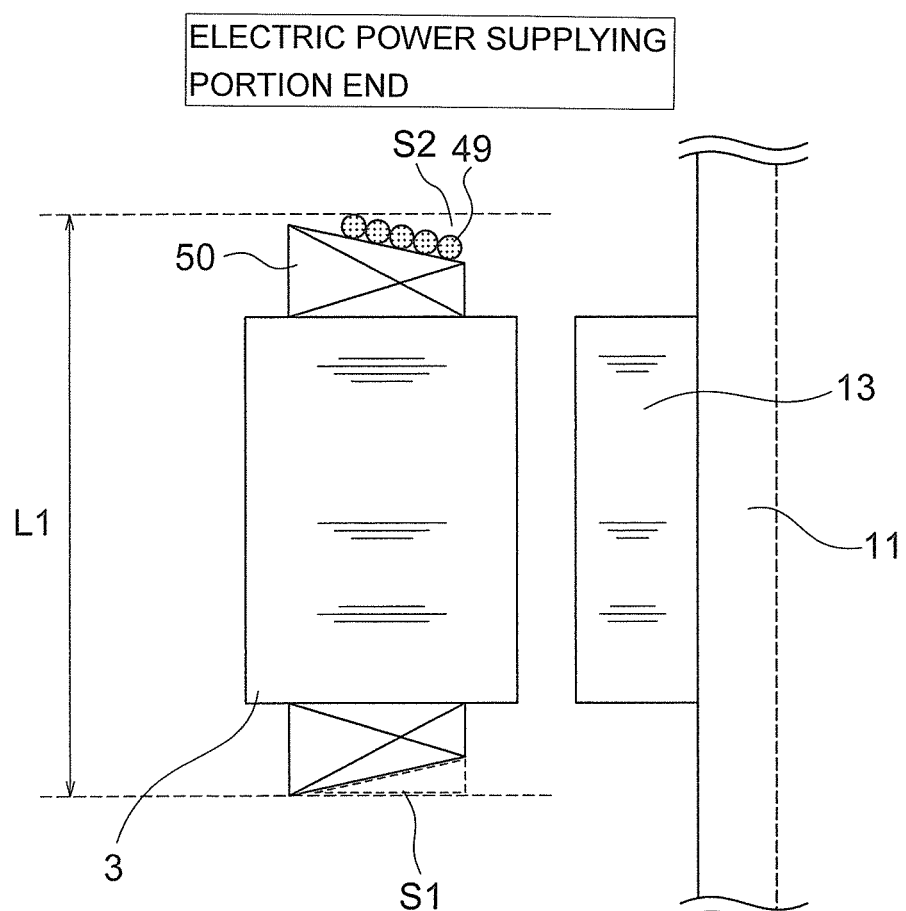
FIG. 9 is a partial cross section that shows a conventional electric motor.

FIG. 8 is a cross section that is taken along Line VIII-VIII in FIG. 3 so as to be viewed in the direction of the arrows, and FIG. 9 is a cross section of portions of a conventional electric motor 1 that correspond to the cross section in FIG. 8.

In the conventional electric motor 1, since coil portions on the same series circuit (U12 and U13 of the first U-phase winding portion U1, for example) are connected by means of crossover wires 49 at the electric power supplying portion end, positions occur where the crossover wires 49 cross at the electric power supplying portion end. Because of that, the number of crossover wires 49 at the electric power supplying portion end and the positions at which the crossover wires 49 cross are increased.

As shown in FIG. 4, the slots 22 of a stator core 3 generally have a trapezoidal shape in which an inner circumferential side is a short side and an outer circumferential side is a long side. Because of that, more of the windings must be wound onto the outer circumferential side of the teeth 21 than the inner circumferential side, and vacant space S1 such as that shown in FIG. 9 is formed on coil ends 50.

In the conventional electric motor 1 that is shown in this figure, this vacant space S1 is dead space, and the stator axial length L1 of the electric motor 1 is increased as a result.

In contrast to that, in the electric motor 1 according to Embodiment 1, since the crossover wires 49 that connect the identical-phase coil portions that are connected in the series circuits are connected at the end near the pulley 17, the vacant space S1 at the electric power supplying portion opposing end can be utilized effectively, and as a result stator axial length L2 of the electric motor 1 is shorter than L1 above.

Since the first U-phase winding portion U1, which constitutes a series circuit using U11, U12, and U13, and the second U-phase winding portion U2, which constitutes a series circuit using U21, U22 and U23, for example, have not even one position where crossover wires 49 cross each other at the end near the pulley 17, winding operations are facilitated, improving workability.

Since a three-phase two-parallel delta connection can be configured by connecting the adjacent U-phase coil portions U11 and U21, U13 and U23, V11 and V21, V13 and V23, W11 and W21, and W13 and W23 at the parallel circuit connecting portions X1, X2, Y1, Y2, Z1, and Z2 by means of respective lead wires 51 and also connecting each at the delta-connection connecting portions A, B, and C in the vacant space S2 at the electric power supplying portion end, the stator axial length L2 of the electric motor 1 is shortened, enabling a small, light electric motor 1 to be obtained.

Moreover, in this case, the respective identical-phase coil portions that are connected into the series circuit are wound consecutively, and the crossover wires 49 are disposed in the vacant space S1 at the electric power supplying portion opposing end, but similar or identical effects can also be achieved by disposing a member such as a connecting board that fits inside the vacant space S1, etc., and arranging crossover wires thereon.

Since only coil portions of a single phase are disposed in any one slot 22, and different-phase coil portions do not coexist, effects can be achieved such as improving space factor, and enabling torque to be improved.

In addition, if the number of turns of the conducting wires in U12, U22, V12, V22, W12, and W22, which are identical-phase coil portions that have no lead wires 51 among the identical-phase coil portions that constitute each of the series circuits, is made T, where T is a natural number, then since the number of turns of the conducting wires in U11, U13, U21, U23, V11, V13, V21, V23, W11, W13, W21, and W13, which are identical-phase coil portions that have lead wires 51 among the coil portions that constitute each of the series circuits, becomes T±0.5 (2n−1) turns, where n is a natural number, effects can be achieved such as improving space factor and enabling torque to be improved compared to when the number of turns in all of the coil portions is an integer.

Embodiment 2

Figure 10:
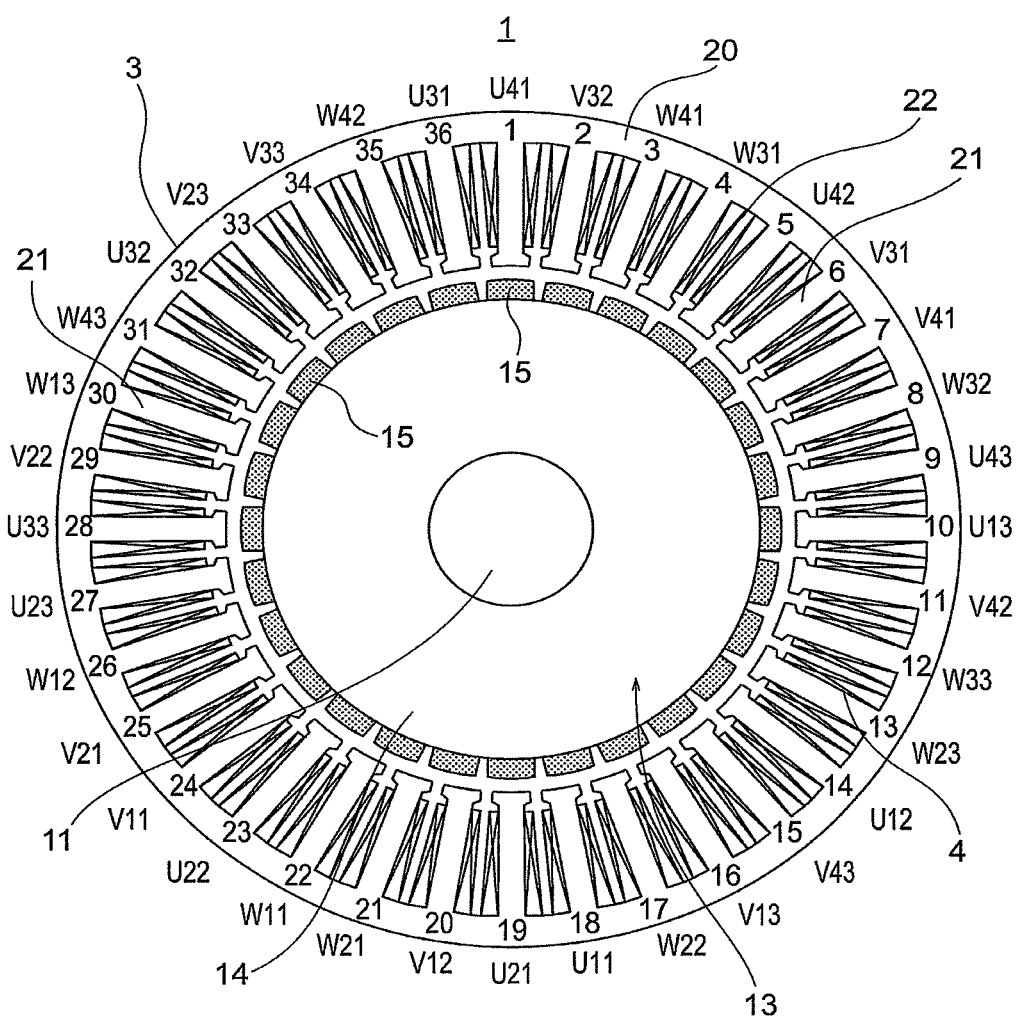
FIG. 10 is a frontal cross section that shows an electric motor according to Embodiment 2 of the present invention.

FIG. 10 is a frontal cross section that shows an electric motor 1 according to Embodiment 2 of the present invention.

In this electric motor 1, the number of poles in a rotor 13 is twenty-eight, and the number of teeth 21 in a stator core 3 is thirty-six.

A shaft 11, and a rotor core 14 outside the shaft 11, are disposed in the rotor 13, and twenty-eight permanent magnets 15 are affixed to an outer circumferential surface of the rotor core 14 at a uniform pitch in a circumferential direction.

Moreover, although omitted from FIG. 10, an outer side of the permanent magnets 15 may be covered by a cover in which a nonmagnetic material such as a stainless alloy or aluminum is made into a cylindrical shape to protect and prevent scattering of the permanent magnets 15.

A stator 5 includes: the stator core 3; and an armature winding 4 that is mounted to this stator core 3.

The stator core 3 has: an annular core back 20; and thirty-six teeth 21 that extend radially inward from the core back 20, and that form slots 22.

The armature winding 4 is constituted by respective coil portions in which conducting wires are wound in concentration onto each of the teeth 21.

Moreover, insulators that are disposed between the armature winding 4 and the stator core 3 and a frame that is disposed around an outer circumference of the stator core 3 are omitted from FIG. 10 for simplicity. Numbers 1 through 36 are also allocated to the teeth 21 for convenience.

Numbering is applied to the coil portions that are configured by winding conductor wires in concentration onto each of the teeth 21 for convenience so that it is clear to which of the three phases, i.e., U, V, or W, each coil portion belongs.

The respective U, V, and W phases are respectively configured such that the U phase is constituted by twelve coils portions, i.e., U11, U12, U13, U21, U22, U23, U31, U32, U33, U41, U42, and U43, the V phase is constituted by twelve coils portions, i.e., V11, V12, V13, V21, V22, V23, V31, V32, V33, V41, V42, and V43, and the W phase is constituted by twelve coils portions, i.e., W11, W12, W13, W21, W22, W23, W31, W32, W33, W41, W42, and W43.

As shown in FIG. 10, the coil portions in each phase are configured so as to line up in order of U41, V32, W41, W31, U42, V31, V41, W32, U43, U13, V42, W33, W23, U12, V43, V13, W22, U11, U21, V12, W21, W11, U22, V11, V21, W12, U23, U33, V22, W13, W43, U32, V23, V33, W42, and U31 so as to correspond to the respective Numbers 1 through 36 of the teeth 21.

Figure 11:
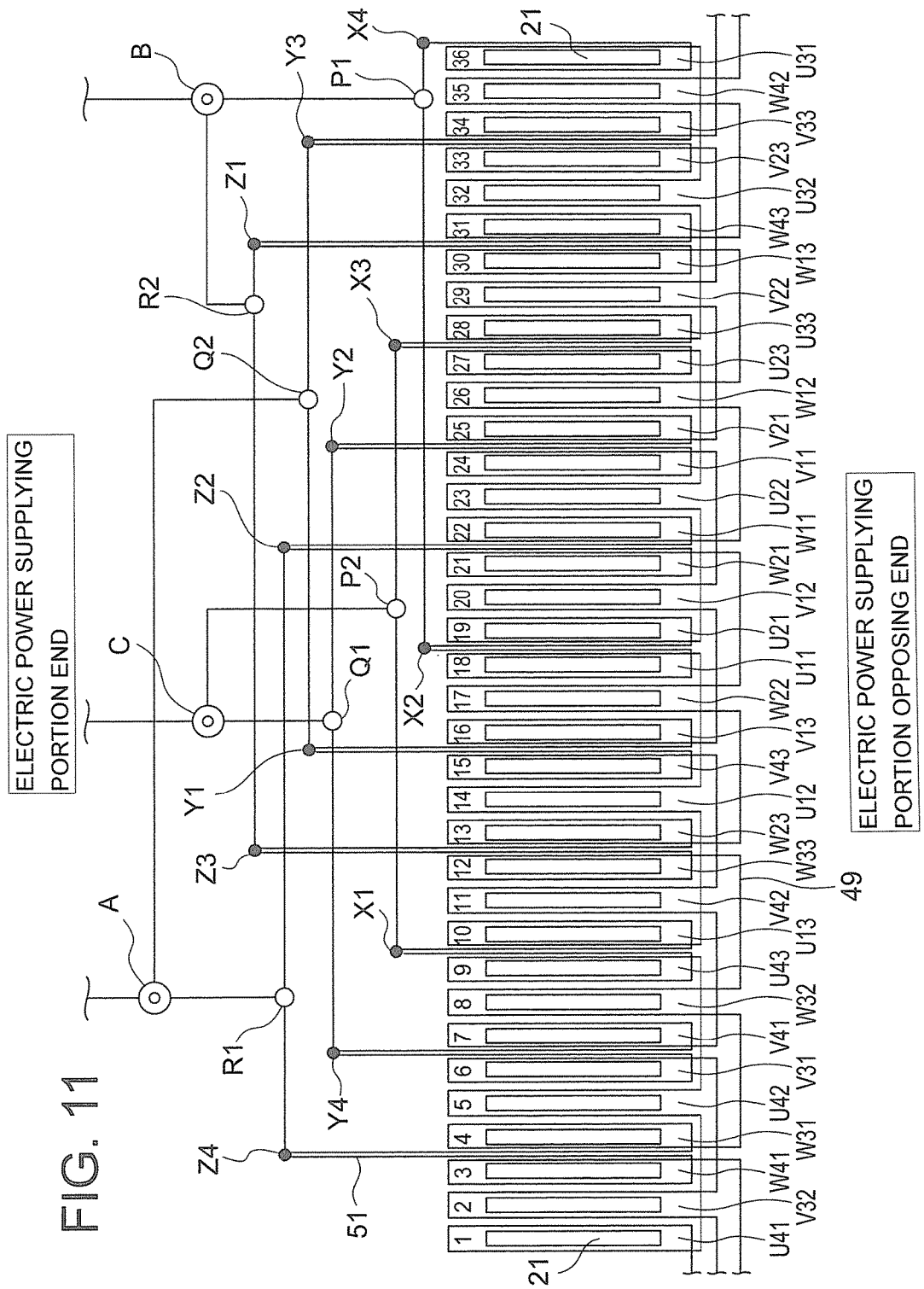
FIG. 11 is a connection explaining diagram for an armature winding of the electric motor from FIG. 10.

FIG. 11 is a connection explaining diagram for the armature winding 4, being a diagram that shows how the thirty-six coil portions are electrically connected.

The row of thirty-six quadrangular shapes represents each of the teeth 21 from Numbers 1 through 36, the coil portions that are mounted to each of the teeth 21 being indicated by U41, V32, W41, W31, U42, V31, V41, W32, U43, U13, V42, W33, W23, U12, V43, V13, W22, U11, U21, V12, W21, W11, U22, V11, V21, W12, U23, U33, V22, W13, W43, U32, V23, V33, W42, and U31.

U11, U12, and U13 are connected in series to constitute the first U-phase winding portion U1, which is an identical-phase winding portion. Here, the winding direction of the conducting wire in U12 is in an opposite direction to that of U11 and U13. U21, U22, and U23 are connected in series to constitute the second U-phase winding portion U2, which is an identical-phase winding portion. Here, the winding direction of the conducting wire in U22 is in an opposite direction to that of U21 and U23. U31, U32, and U33 are connected in series to constitute the third U-phase winding portion U3, which is an identical-phase winding portion. Here, the winding direction of the conducting wire in U32 is in an opposite direction to that of U31 and U33. U41, U42, and U43 are connected in series to constitute the fourth U-phase winding portion U4, which is an identical-phase winding portion. Here, the winding direction of the conducting wire in U42 is in an opposite direction to that of U41 and U43.

V11, V12, and V13 are connected in series to constitute the first V-phase winding portion V1, which is an identical-phase winding portion. Here, the winding direction of the conducting wire in V12 is in an opposite direction to that of V11 and V13. V21, V22, and V23 are connected in series to constitute the second V-phase winding portion V2, which is an identical-phase winding portion. Here, the winding direction of the conducting wire in V22 is in an opposite direction to that of V21 and V23. V31, V32, and V33 are connected in series to constitute the third V-phase winding portion V3, which is an identical-phase winding portion. Here, the winding direction of the conducting wire in V32 is in an opposite direction to that of V31 and V33. V41, V42, and V43 are connected in series to constitute the fourth V-phase winding portion V4, which is an identical-phase winding portion. Here, the winding direction of the conducting wire in V42 is in an opposite direction to that of V41 and V43.

W11, W12, and W13 are connected in series to constitute the first W-phase winding portion W1, which is an identical-phase winding portion. Here, the winding direction of the conducting wire in W12 is in an opposite direction to that of W11 and W13. W21, W22, and W23 are connected in series to constitute the second W-phase winding portion W2, which is an identical-phase winding portion. Here, the winding direction of the conducting wire in W22 is in an opposite direction to that of W21 and W23. W31, W32, and W33 are connected in series to constitute the third W-phase winding portion W3, which is an identical-phase winding portion. Here, the winding direction of the conducting wire in W32 is in an opposite direction to that of W31 and W33. W41, W42, and W43 are connected in series to constitute the fourth W-phase winding portion W4, which is an identical-phase winding portion. Here, the winding direction of the conducting wire in W42 is in an opposite to that of W41 and W43.

Moreover, in FIG. 11, respective numbering for the first U-phase winding portion U1, the second U-phase winding portion U2, the third U-phase winding portion U3, the fourth U-phase winding portion U4, the first V-phase winding portion V1, the second V-phase winding portion V2, the third V-phase winding portion V3, the fourth V-phase winding portion V4, the first W-phase winding portion W1, the second W-phase winding portion W2, the third W-phase winding portion W3 and the fourth W-phase winding portion W4, i.e., U1, U2, U3, U4, V1, V2, V3, V4, W1, W2, W3, and W4, which are identical-phase winding portions, is omitted.

In the electric motor 1 according to Embodiment 2 of the present invention, in the first U-phase winding portion U1, which is connected in series, lead wires 51 are led out from U11 and U13 in a first axial direction, and U11, U12, and U13 are connected by means of crossover wires 49 in a second axial direction. Similarly, in the second U-phase winding portion U2, lead wires 51 are led out from U21 and U23 in the first axial direction, and U21, U22, and U23 are connected by means of crossover wires 49 in the second axial direction. In the third U-phase winding portion U3, lead wires 51 are led out from U31 and U33 in the first axial direction, and U31, U32, and U33 are connected by means of crossover wires 49 in the second axial direction. In the fourth U-phase winding portion U4, lead wires 51 are led out from U41 and U43 in the first axial direction, and U41, U42, and U43 are connected by means of crossover wires 49 in the second axial direction. In the first V-phase winding portion V1, lead wires 51 are led out from V11 and V13 in the first axial direction, and V11, V12, and V13 are connected by means of crossover wires 49 in the second axial direction.

Similarly, in the second V-phase winding portion V2, lead wires 51 are led out from V21 and V23 in the first axial direction, and V21, V22, and V23 are connected by means of crossover wires 49 in the second axial direction. In the third V-phase winding portion V3, lead wires 51 are led out from V31 and V33 in the first axial direction, and V31, V32, and V33 are connected by means of crossover wires 49 in the second axial direction. In the fourth V-phase winding portion V4, lead wires 51 are led out from V41 and V43 in the first axial direction, and V41, V42, and V43 are connected by means of crossover wires 49 in the second axial direction.

In the first W-phase winding portion W1, lead wires 51 are led out from W11 and W13 in the first axial direction, and W11, W12, and W13 are connected by means of crossover wires 49 in the second axial direction. Similarly, in the second W-phase winding portion W2, lead wires 51 are led out from W21 and W23 in the first axial direction, and W21, W22, and W23 are connected by means of crossover wires 49 in the second axial direction, and in the third W-phase winding portion W3, lead wires 51 are led out from W31 and W33 in the first axial direction, and W31, W32, and W33 are connected by means of crossover wires 49 in the second axial direction. In the fourth W-phase winding portion W4, lead wires 51 are led out from W41 and W43 in the first axial direction, and W41, W42, and W43 are connected by means of crossover wires 49 in the second axial direction.

In this manner, in the electric motor 1 according to Embodiment 2 of the present invention, twenty-four lead wires 51 emerge in the first axial direction from the electric motor 1 as a whole, from the winding start and the winding finish of the conducting wires of the respective first and second phase winding portions U1, U2, V1, V2, W1, and W2 that are connected to each of the series circuits.

Specifically, the configuration is such that, among the coil portions that are mounted to the stator core 3, the lead wires 51 emerge from positions at which pairs of identical-phase coil portions are adjacent to each other in a circumferential direction, namely U11 and U21, U23 and U33, U31 and U41, U43 and U13, V11 and V21, V23 and V33, V31 and V41, V43 and V13, W11 and W21, W23 and W33, W31 and W41, and W43 and W13. In other words, in the respective phases of U1 through U4, V1 through V4, and W1 through W4, among mutually different pairs of identical-phase winding portions, the coil portions U23, U31, U43, V11, V23, V31, V43, W11, W23, W31, and W43 from which the lead wires 51 are led out in the first identical-phase winding portions are first coil portions, the coil portions U21, U33, U41, U13, V21, V33, V41, V13, W21, W33, W41, and W13 from which the lead wires 51 are led out in the second identical-phase winding portions are second coil portions, and the first coil portions are disposed so as to be adjacent to the second coil portions in the circumferential direction of the stator core 3. Furthermore, the phases of the first coil portions are identical phases to the phases of the second coil portions that are disposed so as to be adjacent to the first coil portions. The crossover wires 49 that connect the identical-phase winding portions, on the other hand, are led out in the second axial direction.

By connecting the lead wires 51 that are led out from these circumferentially adjacent pairs of identical-phase coil portions, the configuration becomes such that each of the phases is constituted by one set of four parallel circuits.

Here, a primary parallel circuit connecting portion X2 is formed by connecting the circumferentially adjacent U11 and U21. Similarly, a primary parallel circuit connecting portion X3 is formed by connecting the circumferentially adjacent U23 and U33. A primary parallel circuit connecting portion X4 is formed by connecting the circumferentially adjacent U31 and U41. A primary parallel circuit connecting portion X1 is formed by connecting the circumferentially adjacent U43 and U13. A primary parallel circuit connecting portion Y2 is formed by connecting the circumferentially adjacent V11 and V21. Similarly, a primary parallel circuit connecting portion Y3 is formed by connecting the circumferentially adjacent V23 and V33. A primary parallel circuit connecting portion Y4 is formed by connecting the circumferentially adjacent V31 and V41. A primary parallel circuit connecting portion Y1 is formed by connecting the circumferentially adjacent V43 and V13. A primary parallel circuit connecting portion Z2 is formed by connecting the circumferentially adjacent W11 and W21. Similarly, a primary parallel circuit connecting portion Z3 is formed by connecting the circumferentially adjacent W23 and W33. A primary parallel circuit connecting portion Z4 is formed by connecting the circumferentially adjacent W31 and W41. A primary parallel circuit connecting portion Z1 is formed by connecting the circumferentially adjacent W43 and W13.

The electric motor 1 according to Embodiment 2 is a three-phase four-parallel electric motor 1 that has primary parallel circuit connecting portions at twelve positions.

Among these twelve primary parallel circuit connecting portions X1, X2, X3, X4, Y1, Y2, Y3, Y4, Z1, Z2, Z3, and Z4, identical-phase primary parallel circuit connecting portions that are disposed every 180 mechanical degrees are connected. The primary parallel circuit connecting portion X1 and the primary parallel circuit connecting portion X3 are connected to form a secondary parallel circuit connecting portion P2. The primary parallel circuit connecting portion X2 and the primary parallel circuit connecting portion X4 are connected to form a secondary parallel circuit connecting portion P1. The primary parallel circuit connecting portion Y1 and the primary parallel circuit connecting portion Y3 are connected to form a secondary parallel circuit connecting portion Q2. The primary parallel circuit connecting portion Y2 and the primary parallel circuit connecting portion Y4 are connected to form a secondary parallel circuit connecting portion Q1. The primary parallel circuit connecting portion Z1 and the primary parallel circuit connecting portion Z3 are connected to form a secondary parallel circuit connecting portion R2. The primary parallel circuit connecting portion Z2 and the primary parallel circuit connecting portion Z4 are connected to form a secondary parallel circuit connecting portion R1.

The electric motor 1 according to Embodiment 2 of the present invention is driven by supplying electric power from external electric power supplying portions 16 to the delta-connection connecting portion A, the delta-connection connecting portion B, and the delta-connection connecting portion C.

Moreover, in this case, the electric power supplying portions 16 are separate members from the primary parallel circuit connecting portions X1, X2, X3, X4, Y1, Y2, Y3, Y4, Z1, Z2, Z3, and Z4, the secondary parallel circuit connecting portions P1, P2, Q1, Q2, R1, and R2, and the delta-connection connecting portions A, B, and C, but the electric power supplying portions 16 may serve as any of the primary parallel circuit connecting portions, the secondary parallel circuit connecting portions, or delta-connection connecting portions, or may serve as all of them.

By adopting a configuration of this kind, crossover wires 49 are required for configuring the four parallel circuits, but since vacant spaces S1 and S2 at the electric power supplying portion end and the electric power supplying portion opposing end can be utilized effectively compared to conventional constructions, stator axial length L is reduced, enabling a small, light electric motor 1 to be obtained by shortening the stator axial length L of the electric motor 1.

In Embodiment 1, the number of magnetic poles is fourteen and the number of teeth 21 is eighteen, and in Embodiment 2, the number of magnetic poles is twenty-eight and the number of teeth 21 is thirty-six, but if the number of magnetic poles and the number of teeth 21 is generalized from the electric motors 1 in Embodiments 1 and 2 above, then it is expressed by relationships $M=(18\pm4)n$ and $N=18n$, where M is the number of magnetic poles, N is the number of teeth 21, and n is a natural number.

By deciding the number of magnetic poles and the number of teeth 21 in the electric motor 1 using these relationships, positions where the conducting wires cross can be reduced at the electric power supplying portion end, improving manufacturability, and enabling the stator axial length L to be shortened.

Space factor also improves, and torque can be improved.

Embodiment 3

Figure 12:
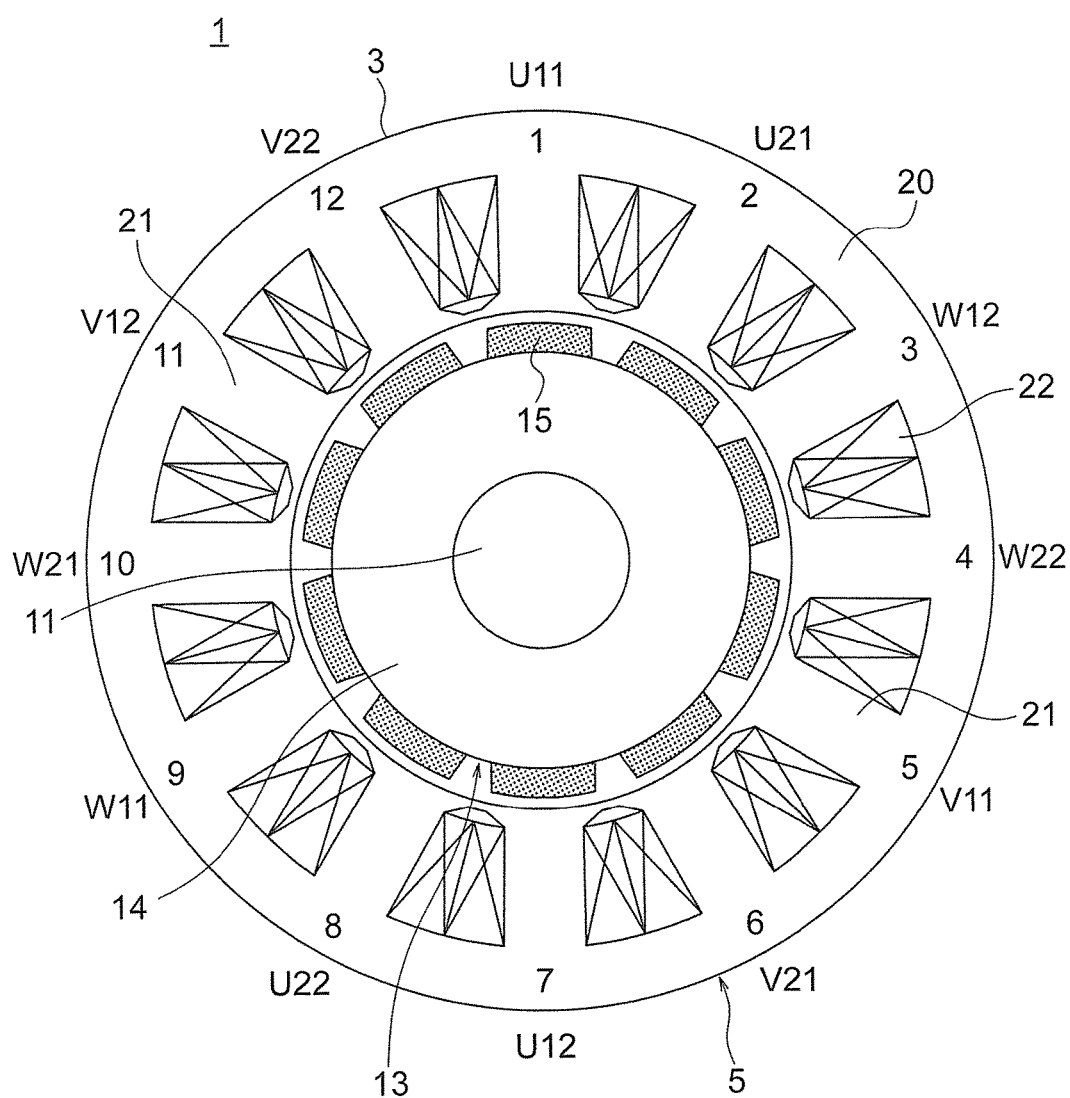
FIG. 12 is a frontal cross section that shows an electric motor according to Embodiment 3 of the present invention.

FIG. 12 is a frontal cross section that shows an electric motor 1 according to Embodiment 3 of the present invention.

In this electric motor, the number of poles in a rotor 13 is ten, and the number of teeth 21 in a stator core 3 is twelve.

The rotor 13 has: a shaft 11; a rotor core 14 that is disposed outside the shaft 11; and ten permanent magnets 15 that are affixed to an outer circumferential surface of the rotor core 14 at a uniform spacing in a circumferential direction.

Moreover, although omitted from FIG. 12, an outer side of the permanent magnets 15 may be covered by a cover in which a nonmagnetic material such as a stainless alloy or aluminum is made into a cylindrical shape to protect and prevent scattering of the permanent magnets 15.

A stator 5 has: the stator core 3; and an armature winding 4 that is mounted to this stator core 3.

The stator core 3 has: an annular core back 20; and twelve teeth 21 that extend radially inward from the core back 20, and that form slots 22.

In this example, the teeth 21 have flange portions that protrude on two circumferential sides from tip portions of the teeth 21, the flange portions of pairs of adjacent teeth 21 being connected to each other.

The armature winding 4 is constituted by respective coil portions in which conducting wires are wound in concentration onto each of the teeth 21.

Moreover, insulators that are disposed between the armature winding 4 and the stator core 3 and a frame that is disposed around an outer circumference of the stator core 3 are omitted from FIG. 12 for simplicity. Numbers 1 through 12 are also allocated to the teeth 21 for convenience.

Numbering is applied to the coil portions that are configured by winding conductor wires in concentration onto each of the teeth 21 for convenience so that it is clear to which of the three phases, i.e., U, V, or W, each coil portion belongs.

The U phase is constituted by four coils portions, i.e., U11, U12, U21, and U22, the V phase is constituted by four coils portions, i.e., V11, V12, V21, and V22, and the W phase is constituted by four coils portions, i.e., W11, W12, W21, and W22.

As shown in FIG. 12, the coil portions for each of the phases are disposed so as to line up sequentially in order of U11, U21, W12, W22, V11, V21, U12, U22, W11, W21, V12, and V22 so as to correspond to each of Numbers 1 through 12 of the teeth 21.

Figure 13:
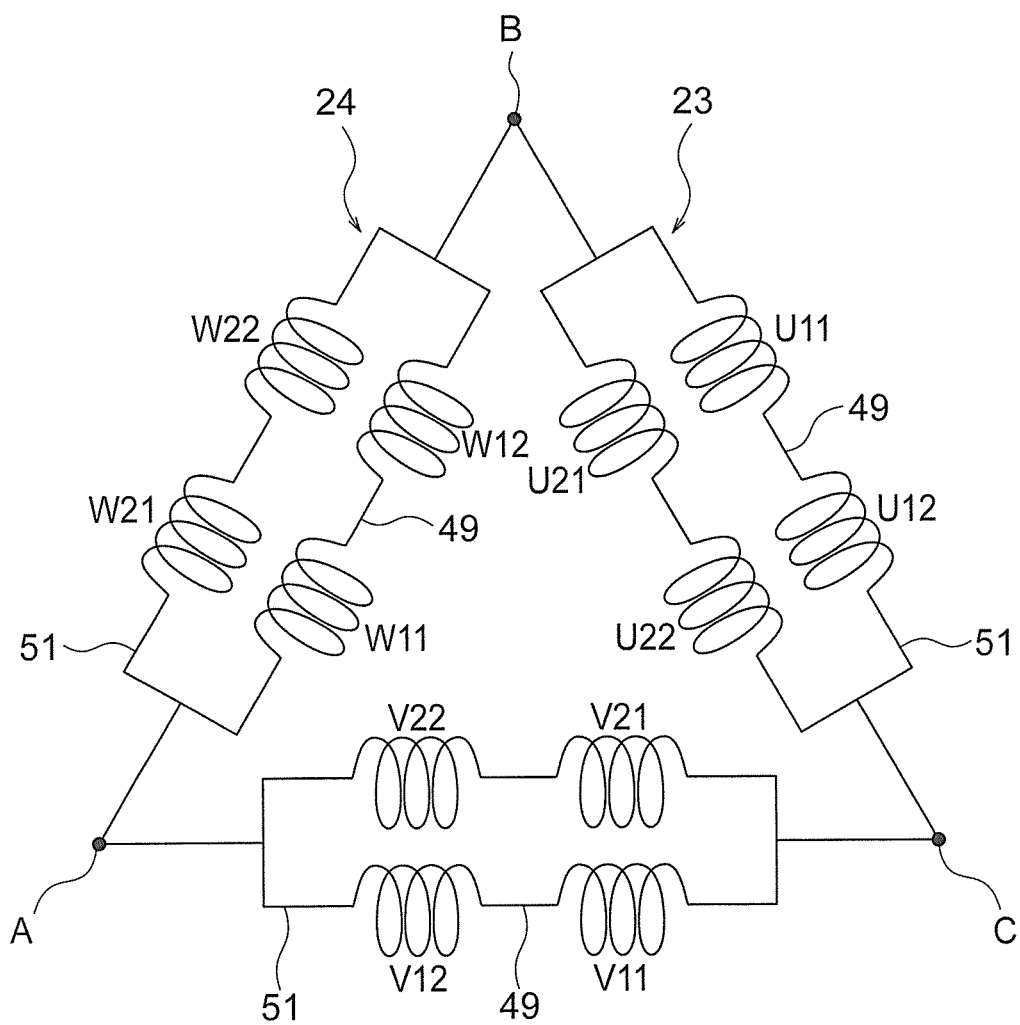
FIG. 13 is a circuit diagram that shows an armature winding from FIG. 12.

FIG. 13 is a winding circuit diagram that shows the armature winding 4 of the electric motor.

The armature winding 4 is constituted by a first armature winding portion 23 and a second armature winding portion 24.

The first armature winding portion 23 is constituted by a first U-phase winding portion U1, a first V-phase winding portion V1, and a first W-phase winding portion W1. The first U-phase winding portion U1 is an identical-phase winding portion in which U11 and U12, which are identical-phase coil portions, are connected in series. The first V-phase winding portion V1 is an identical-phase winding portion in which V11 and V12, which are identical-phase coil portions, are connected in series. The first W-phase winding portion W1 is an identical-phase winding portion in which W11 and W12, which are identical-phase coil portions, are connected in series.

The second armature winding portion is constituted by a second U-phase winding portion U2, a second V-phase winding portion V2, and a second W-phase winding portion W2. The second U-phase winding portion U2 is an identical-phase winding portion in which U21 and U22, which are identical-phase coil portions, are connected in series. The second V-phase winding portion V2 is an identical-phase winding portion in which V21 and V22, which are identical-phase coil portions, are connected in series. The second W-phase winding portion W2 is an identical-phase winding portion in which W21 and W22, which are identical-phase coil portions, are connected in series.

The respective coil portions U22, V11, V12, V21, V22, W11, W12, W21, and W22, where adjacent, are connected together by means of crossover wires 49, and respective lead wires 51 lead out from two end portions of each of the identical-phase winding portions U1, U2, V1, V2, W1, and W2.

The first U-phase winding portion U1 and the second U-phase winding portion U2 are connected into a parallel circuit by means of the lead wires 51, which are led out in a first axial direction, the first V-phase winding portion V1 and the second V-phase winding portion V2 are connected into a parallel circuit by means of the lead wires 51, which are led out in the first axial direction, and the first W-phase winding portion W1 and the second W-phase winding portion W2 are connected into a parallel circuit by means of the lead wires 51, which are led out in the first axial direction.

The armature winding 4 is connected at delta-connection connecting portions A, B, and C to form a delta connection.

Figure 14:
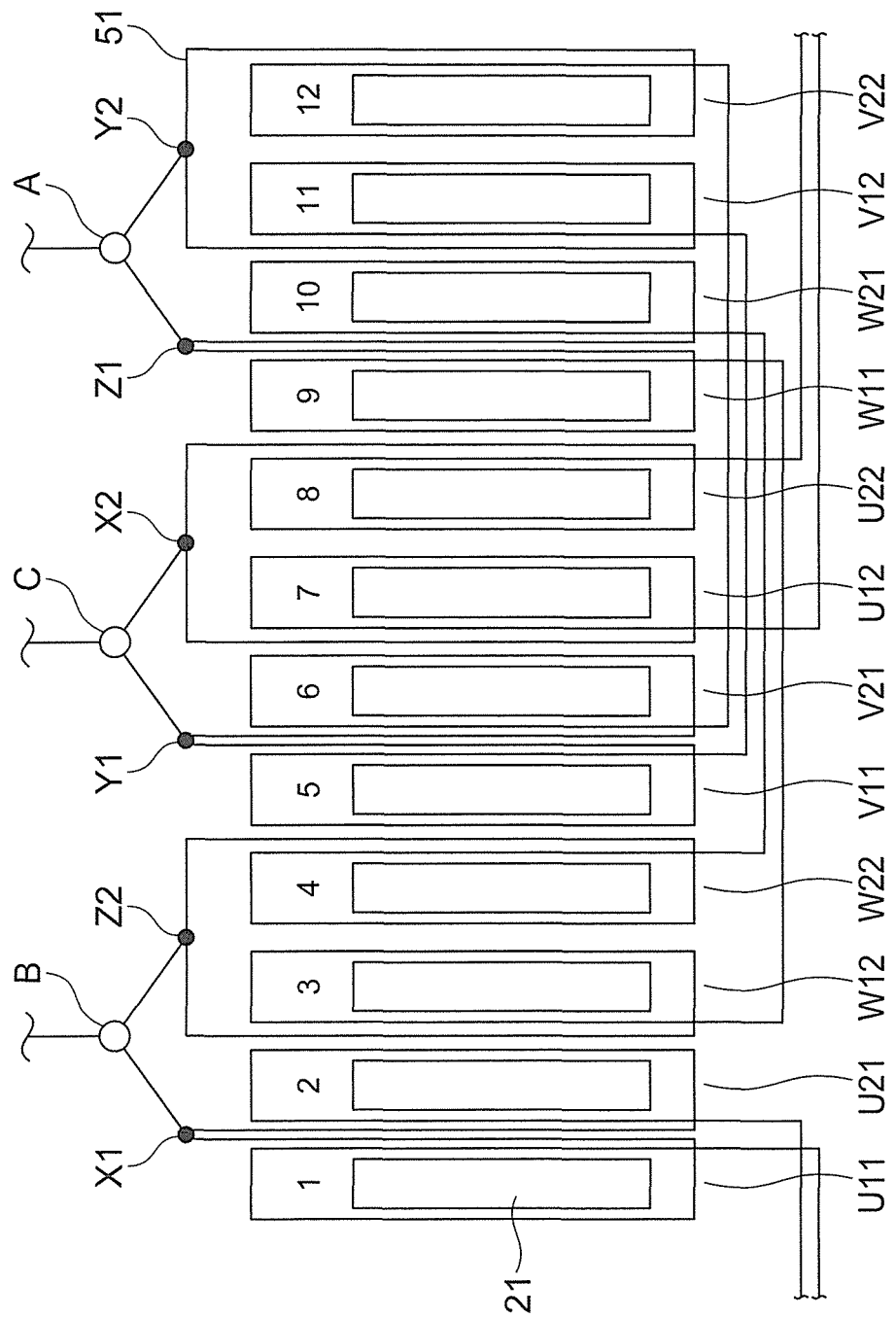
FIG. 14 is a connection explaining diagram for the armature winding of the electric motor from FIG. 12.

FIG. 14 is a connection explaining diagram for the armature winding 4, being a diagram that shows how the twelve coil portions are electrically connected.

The row of twelve quadrangular shapes represents each of the teeth 21 from Numbers 1 through 12, the coil portions that are mounted to each of the teeth 21 being indicated by U11, U21, W21, W22, V11, V12, U21, U22, W11, W12, V21, and V22.

U11 and U12 are connected in series to constitute the first U-phase winding portion U1, which is an identical-phase winding portion. Here, the winding directions of the conducting wire in U11 and U12 are in opposite directions. U21 and U22 are connected in series to constitute the second U-phase winding portion U2, which is an identical-phase winding portion. Here, the winding directions of the conducting wire in U21 and U22 are in opposite directions.

V11 and V12 are connected in series to constitute the first V-phase winding portion V1, which is an identical-phase winding portion. Here, the winding directions of the conducting wire in V11 and V12 are in opposite directions. V21 and V22 are connected in series to constitute the second V-phase winding portion V2, which is an identical-phase winding portion. Here, the winding directions of the conducting wire in V21 and V22 are in opposite directions.

W11 and W12 are connected in series to constitute the first W-phase winding portion W1, which is an identical-phase winding portion. Here, the winding directions of the conducting wire in W11 and W12 are in opposite directions. W21 and W22 are connected in series to constitute the second W-phase winding portion W2, which is an identical-phase winding portion. Here, the winding directions of the conducting wire in W21 and W22 are in opposite directions.

Moreover, in FIG. 14, respective numbering for the first U-phase winding portion U1, the second U-phase winding portion U2, the first V-phase winding portion V1, the second V-phase winding portion V2, the first W-phase winding portion W1, and the second W-phase winding portion W2, i.e., U1, U2, V1, V2, W1 and W2, which are identical-phase winding portions, is omitted.

In the electric motor according to Embodiment 3 of the present invention, in the first U-phase winding portion U1, which is connected in series, lead wires 51 are led out in a first axial direction, and U11 and U12 are connected by means of a crossover wire 49 in a second axial direction. Similarly, in the second U-phase winding portion U2, lead wires 51 are led out in the first axial direction, and U21 and U22 are connected by means of a crossover wire 49 in the second axial direction.

In the first V-phase winding portion V1, lead wires 51 are led out in the first axial direction, and V11 and V12 are connected by means of a crossover wire 49 in the second axial direction. Similarly, in the second V-phase winding portion V2, lead wires 51 are led out in the first axial direction, and V21 and V22 are connected by means of a crossover wire 49 in the second axial direction.

In the first W-phase winding portion W1, lead wires 51 are led out in the first axial direction, and W11 and W12 are connected by means of a crossover wire 49 in the second axial direction. Similarly, in the second W-phase winding portion W2, lead wires 51 are led out in the first axial direction, and W21 and W22 are connected by means of a crossover wire 49 in the second axial direction.

In this manner, in the electric motor according to Embodiment 3 of the present invention, twelve lead wires 51 emerge in the first axial direction from the electric motor as a whole, from the winding start and the winding finish of the conducting wires of the respective first and second phase winding portions U1, U2, V1, V2, W1, and W2 that are connected to each of the series circuits.

Specifically, the configuration is such that, among the coil portions that are mounted to the stator core 3, the lead wires 51 emerge from positions at which pairs of identical-phase coil portions are adjacent to each other in a circumferential direction, namely U11 and U21, U12 and U22, V11 and V21, V12 and V22, W11 and W21, and W12 and W22. In other words, among mutually different pairs of identical-phase winding portions U1 and U2, V1 and V2, and W1 and W2, the coil portions U11, U12, V11, V12, W11, and W12 from which the lead wires 51 are led out in the first identical-phase winding portions U1, V1, and W1 are first coil portions, the coil portions U21, U22, V21, V22, W21, and W22 from which the lead wires 51 are led out in the second identical-phase winding portions U2, V2, and W2 are second coil portions, and the first coil portions are disposed so as to be adjacent to the second coil portions in the circumferential direction of the stator core 3. Furthermore, the phases of the first coil portions are identical phases to the phases of the second coil portions that are disposed so as to be adjacent to the first coil portions. The crossover wires 49 that connect the identical-phase winding portions, on the other hand, are led out in the second axial direction.

By connecting the lead wires 51 that are led out from these circumferentially adjacent pairs of identical-phase coil portions, the configuration becomes such that each of the phases is constituted by one set of two parallel circuits.

In FIG. 14, X1 is a parallel circuit connecting portion that connects the circumferentially adjacent U11 and U21. Similarly, X2 is a parallel circuit connecting portion that connects the circumferentially adjacent U12 and U22.

Y1 is a parallel circuit connecting portion that connects the circumferentially adjacent V11 and V21. Similarly, Y2 is a parallel circuit connecting portion that connects the circumferentially adjacent V12 and V22.

Z1 is a parallel circuit connecting portion that connects the circumferentially adjacent W11 and W21. Similarly, Z2 is a parallel circuit connecting portion that connects the circumferentially adjacent W12 and W22.

The electric motor according to Embodiment 3 is a three-phase two-parallel electric motor that has six parallel circuit connecting portions X1, X2, Y1, Y2, Z1, and Z2.

The armature winding 4 is configured into a delta connection by connecting circumferentially adjacent different-phase parallel circuit connecting portions X1, X2, Y1, Y2, Z1, and Z2 among these six parallel circuit connecting portions X1, X2, Y1, Y2, Z1, and Z2.

Specifically, A is a delta-connection connecting portion in which the circumferentially adjacent parallel circuit connecting portion Y2 and parallel circuit connecting portion Z1 are connected, B is a delta-connection connecting portion in which the circumferentially adjacent parallel circuit connecting portion X1 and parallel circuit connecting portion Z2 are connected, and C is a delta-connection connecting portion in which the circumferentially adjacent parallel circuit connecting portion X2 and parallel circuit connecting portion Y1 are connected.

The electric motor according to Embodiment 3 is driven by supplying electric power from external electric power supplying portions to each of these delta-connection connecting portions A, B, and C.

Moreover, in this case, the electric power supplying portions are separate members from the parallel circuit connecting portions X1, X2, Y1, Y2, Z1, and Z2 and the delta-connection connecting portions A, B, and C, but the electric power supplying portions may serve as parallel circuit connecting portions or delta-connection connecting portions, or may serve as both.

In the electric motor 1 according to Embodiment 3, since the crossover wires 49 that connect the identical-phase coil portions that are connected in the series circuit are connected at the end near the pulley 17, the vacant space S1 at the electric power supplying portion opposing end can be utilized effectively, and as a result stator axial length L2 of the electric motor 1 is shorter than L1 above.

By adopting a configuration of this kind, since there is not even one position where crossover wires 49 cross each other at an end near the pulley 17, winding operations are facilitated, improving workability.

Since a three-phase two-parallel delta connection can be configured by connecting the adjacent U-phase coil portions U11 and U21, U12 and U22, V11 and V21, V12 and V22, W11 and W21, and W12 and W22 at the parallel circuit connecting portions X1, X2, Y1, Y2, Z1, and Z2 by means of respective lead wires 51 and also connecting each at the delta-connection connecting portions A, B, and C in the vacant space S2 at the electric power supplying portion end, the stator axial length L2 of the electric motor is shortened, enabling a small, light electric motor to be obtained.

Moreover, in this case, the respective identical-phase coil portions that are connected into the series circuit are wound consecutively, and the crossover wires 49 are disposed in the vacant space S1 at the electric power supplying portion opposing end, but similar or identical effects can also be achieved by disposing a member such as a connecting board that fits inside the vacant space S1, etc., and arranging crossover wires 49 thereon.

Since only coil portions of a single phase are disposed in any one slot 22, and different-phase coil portions do not coexist, effects can be achieved such as improving space factor, and enabling torque to be improved.

In Embodiment 3, the number of magnetic poles is ten and the number of teeth 21 is twelve, but if the number of magnetic poles and the number of teeth 21 is generalized from the electric motor in Embodiment 3 above, then it is expressed by relationships M=(12±2)n and N=12n, where M is the number of magnetic poles, N is the number of teeth, and n is a natural number.

By deciding the number of magnetic poles and the number of teeth 21 in the electric motor using these relationships, positions where the conducting wires cross can be reduced at the electric power supplying portion end, improving manufacturability, and enabling the stator axial length L to be shortened.

Space factor also improves, and torque can be improved.

Embodiment 4

In an electric motor 1 according to Embodiment 4, there is a relationship T1>T2, where T1 is the number of turns of conducting wires in U12, U22, V12, V22, W12, and W22 that constitute coil portions that have no lead wires 51 among coil portions that constitute respective series circuits, where T1 is a natural number, and T2 is the number of turns of conducting wires in U11, U13, U21, U23, V11, V13, V21, V23, W11, W13, W21, and W13 that constitute coil portions that have lead wires 51 among the coil portions that constitute the respective series circuits, where T2 is an odd-numbered multiple of 0.5.

Figure 15:
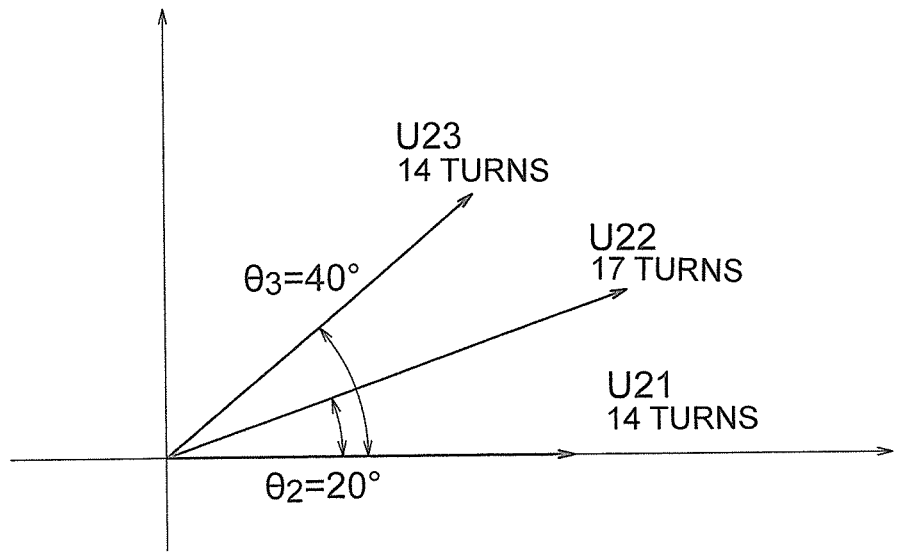
FIG. 15 is an explanatory diagram that shows strengths of magnetomotive forces that are generated by coil portions that constitute part of a second U-phase winding portion of an electric motor according to Embodiment 4 of the present invention.

FIG. 15 shows electrical angular phases of the phase coil portions U21, U22, and U23 in a second U-phase winding portion U2, which is an identical-phase winding portion according to Embodiment 4, as a vector diagram, vector length representing the strength of the magnetomotive force that the coil portions that are mounted to each of the teeth 21 generate, and vector angle representing the electrical angular phase of the coil portions that are mounted to each of the teeth 21.

Since the strength of magnetomotive force that the coil portions generate is proportional to the product of the number of turns of conducting wire and the magnitude of the electric current, vector length in the diagram is proportional to the number of turns.

The coil portions U21, U22, and U23 are disposed sequentially in the circumferential direction of the stator 5 at an electrical angular phase difference of 20 degrees. Consequently, the electrical angular phase differences is largest between the coil portions U21 and U23, that electrical angular phase difference being 40 degrees. Here, if the electrical angle θ=0° is set using coil portion U21 as a base, the electrical angle of the coil portion U22 is 20 degrees, making $\theta_2=20°$, and the electrical angle of the coil portion U23 is 40 degrees, making $\theta_3=40°$.

In Embodiment 4, the coil portion U22 is an overwound coil, in which the number of turns of the conducting wire is greater than other serially connected coil portions, and since the electromagnetic field that is generated is stronger than those of coil portions U21 and U23, the vector length is shown larger than for others.

Figure 16:
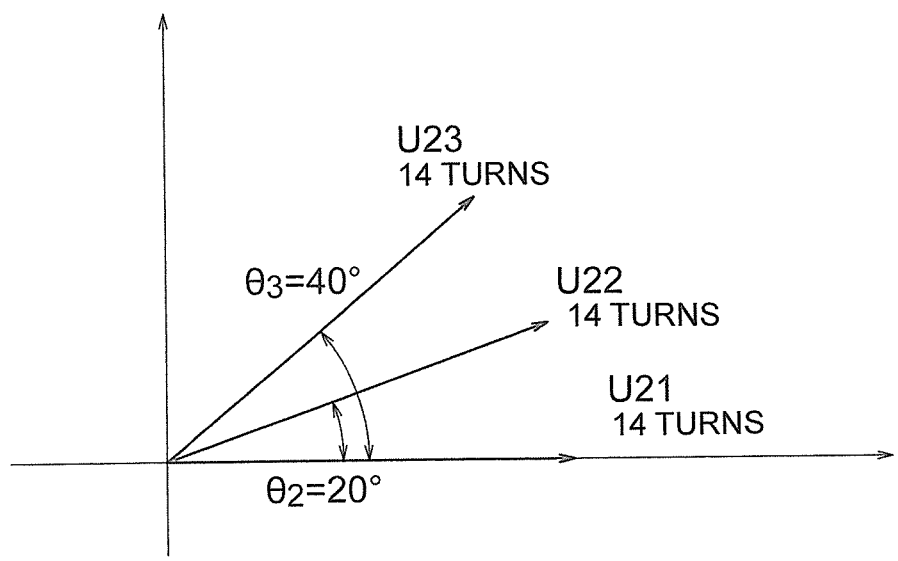
FIG. 16 is an explanatory diagram that shows strengths of magnetomotive forces that are generated by coil portions that constitute part of a second U-phase winding portion of an electric motor when the numbers of turns of all of the conducting wires are equal.

For comparison, magnetomotive force vectors that are generated in coil portions U21, U22, and U23 in a second armature winding portion 24, that has a construction in which the number of turns of conducting wire in all of the coil portions is equal, are shown in FIG. 16. The strength of the magnetomotive force that the U phase generates is expressed by a resultant vector length.

Consequently, in electric motor 1 according to Embodiment 4, the vector where the electrical angular phase that is positioned centrally is increased compared to when the number of turns in all of the coil portions is equal, and the resultant vector length is increased, enabling the strength of the magnetomotive force to be increased.

Magnetic flux density is thereby increased in a magnetic air gap portion between a stator 5 and a rotor 13 of the electric motor 1, enabling torque to be improved.

Embodiment 5

Figure 17:
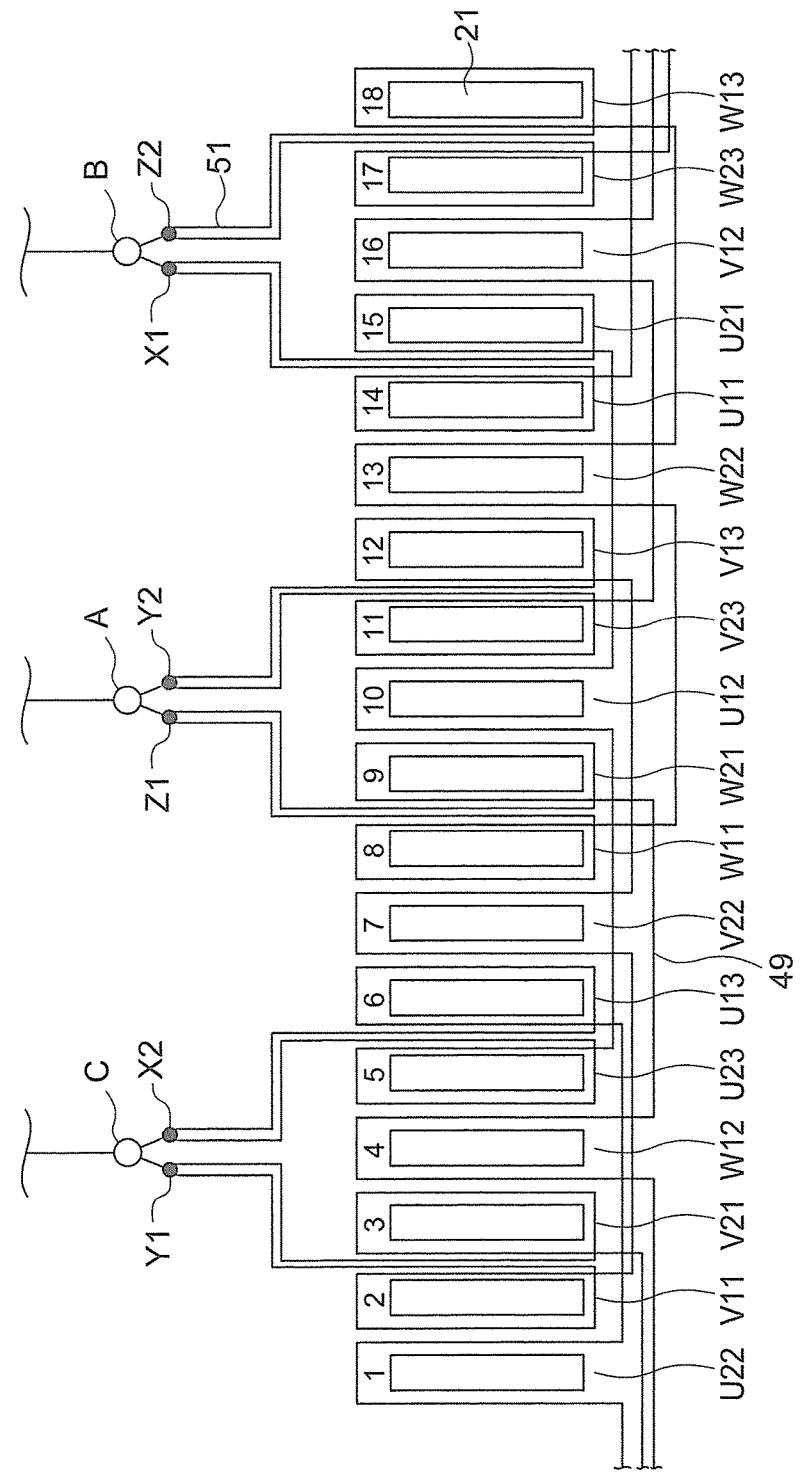
FIG. 17 is a connection explaining diagram for an armature winding of an electric motor according to Embodiment 5 of the present invention.
Figure 18:
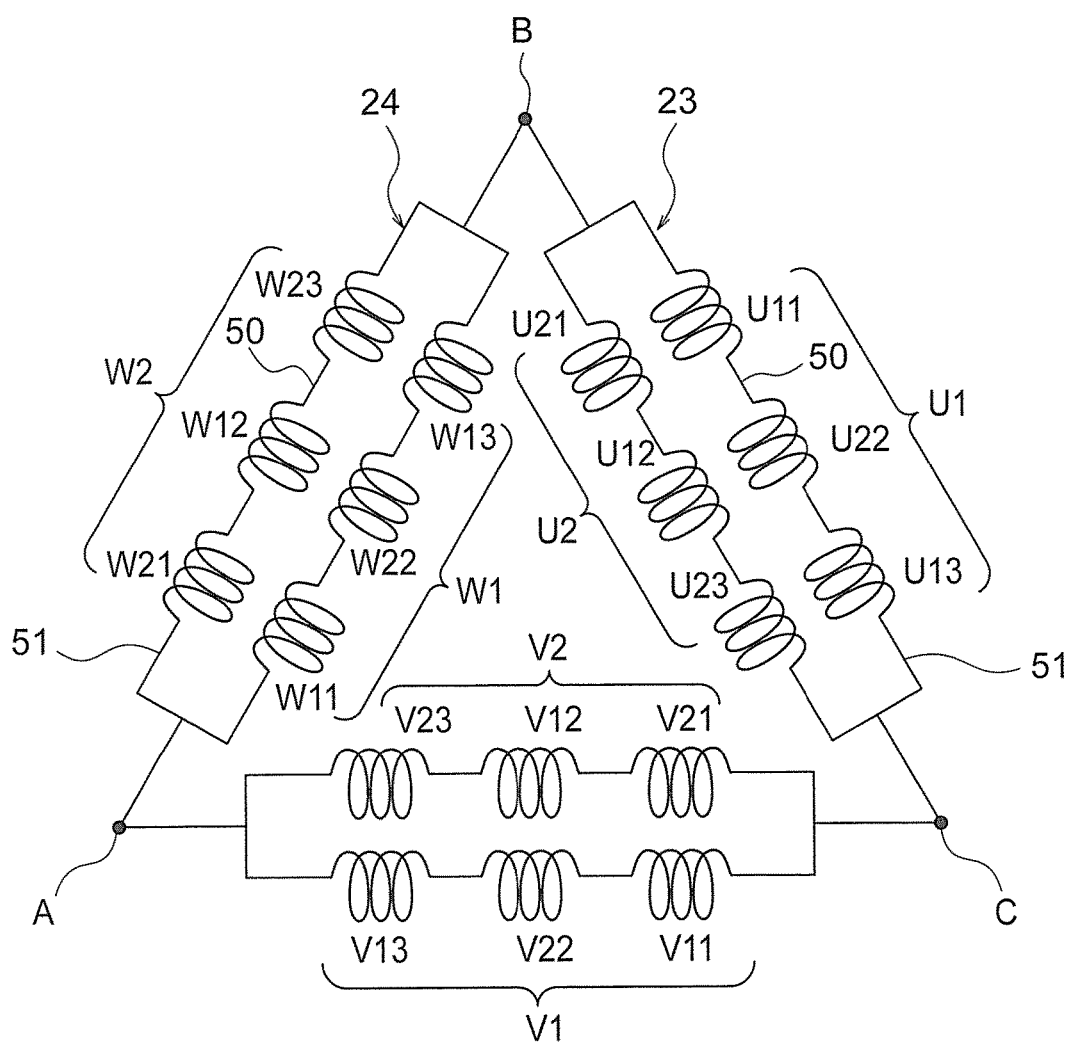
FIG. 18 is a circuit diagram that shows the armature winding from FIG. 17.

FIG. 17 is a connection explaining diagram for an armature winding 4 of an electric motor 1 according to Embodiment 5 of the present invention, being a diagram that shows how eighteen coil portions are electrically connected, and FIG. 18 is a circuit diagram that shows the armature winding from FIG. 17.

In FIG. 17, the row of eighteen quadrangular shapes represents teeth 21 from Numbers 1 through 18, the coil portions in which conducting wire is wound onto each of the teeth 21 being U22, V11, V21, W12, U23, U13, V22, W11, W21, U12, V23, V13, W22, U11, U21, V12, W23, and W13.

U11, U22, and U13, in which the winding directions of the conducting wires are identical, are connected in series to constitute a first U-phase winding portion U1.

Here, the respective adjacent identical-phase coil portions in the same series circuit skip four teeth 21 from each other so as to be disposed on the fifth teeth 21.

Moreover, in a similar or identical manner to that of the first U-phase winding portion U1, the winding directions of the conducting wires are also identical in each of the phase coil portions and the respective adjacent identical-phase coil portions in the same series circuit also skip four teeth 21 from each other so as to be disposed on the fifth teeth 21 in the second U-phase winding portion U2 that is configured by connecting U21, U12, and U23 in series, the first V-phase winding portion V1 in which V11, V22, and V13 are connected in series, the second V-phase winding portion in which V2 V21, V12, and V23 are connected in series, the first W-phase winding portion W1 in which W11, W22, and W13 are connected in series, and the second W-phase winding portion W2 in which W11, W22, and W13 are connected in series.

Similar or identical effects to those of the electric motors 1 according to Embodiments 1 and 2 can also be achieved if connections of this kind are made.

In addition, second-order spatial electromagnetic vibrational forces that act on the electric motor 1 can be significantly reduced.

This is because electromagnetic forces when the electric currents in the first U-phase winding portion U1 and the second U-phase winding portion U2 are unbalanced can be further reduced, because three coil portions that are disposed so as to be distributed over 200 mechanical degrees such as the coil portions U11, U22, and U13, or the coil portions U21, U12, and U23, for example, are connected in series, as shown in FIG. 4, and the first U-phase winding portion U1 and the second U-phase winding portion U2 are disposed at positions that are offset by 180 mechanical degrees from each other.

The first V-phase winding portion V1, the second V-phase winding portion V2, the first W-phase winding portion W1, and the second W-phase winding portion W2 have similar or identical arrangements to those of the first U-phase winding portion U1 and the second U-phase winding portion U2.

Consequently, one effect is that unbalanced electromagnetic forces are reduced, enabling vibration to be reduced, even if irregularities arise in resistance values and inductance values during manufacturing, which create imbalances in the electric currents in the first armature winding portion 23 and the second armature winding portion 24 that constitute part of the electric motor 1.

In electric power steering apparatuses to which the above electric motor 1 is mounted, in particular, reducing cogging torque and torque ripples in order to provide a superior steering feel is desirable, since cogging torque and torque ripples that the electric motor 1 generates are transmitted to the driver through the gears, making the effect of enabling vibration and noise to be reduced when the electric motor 1 is operating significant.

Embodiment 6

Figure 19:
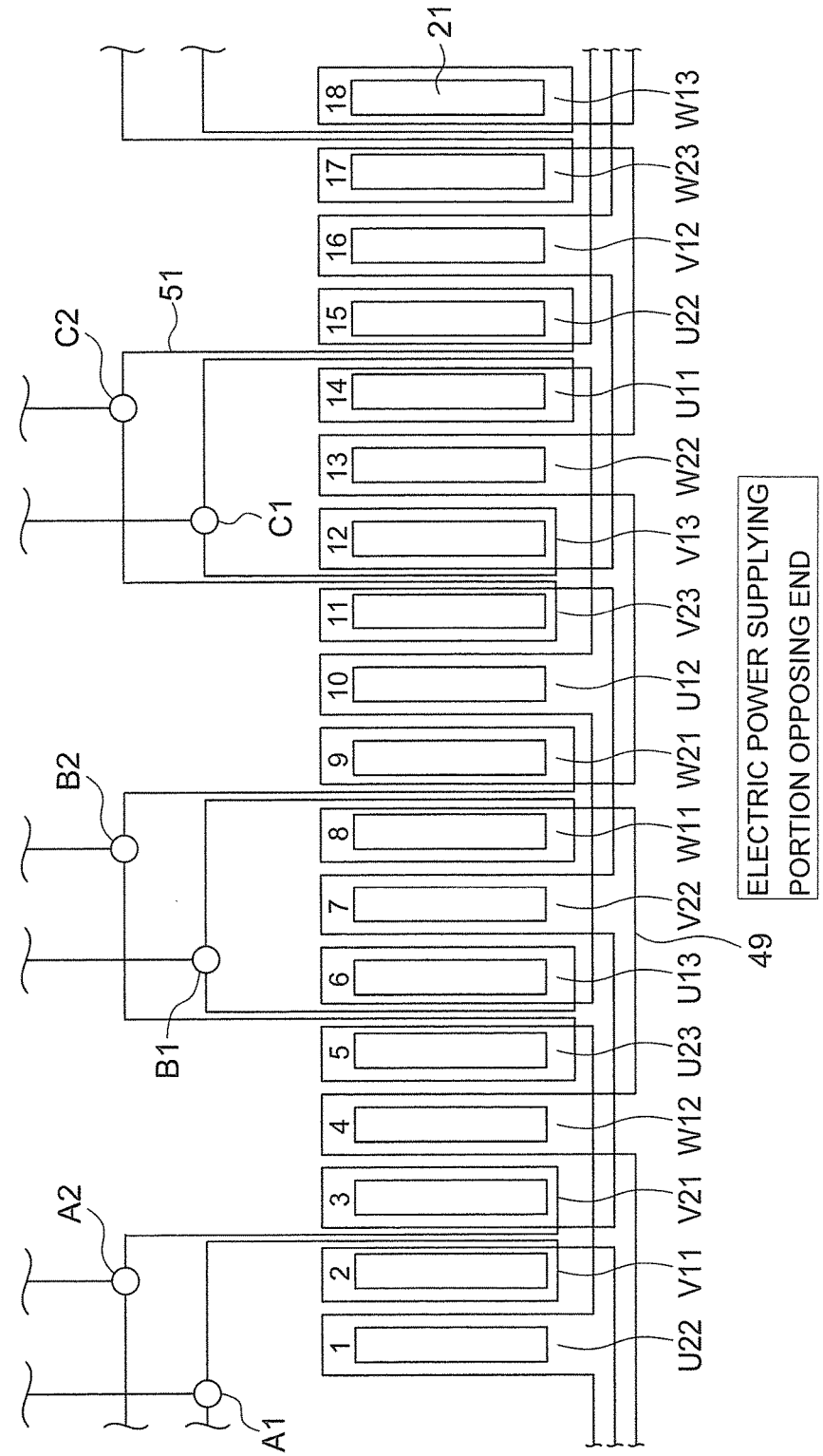
FIG. 19 is a connection explaining diagram for an armature winding of an electric motor according to Embodiment 6 of the present invention.
Figure 20:
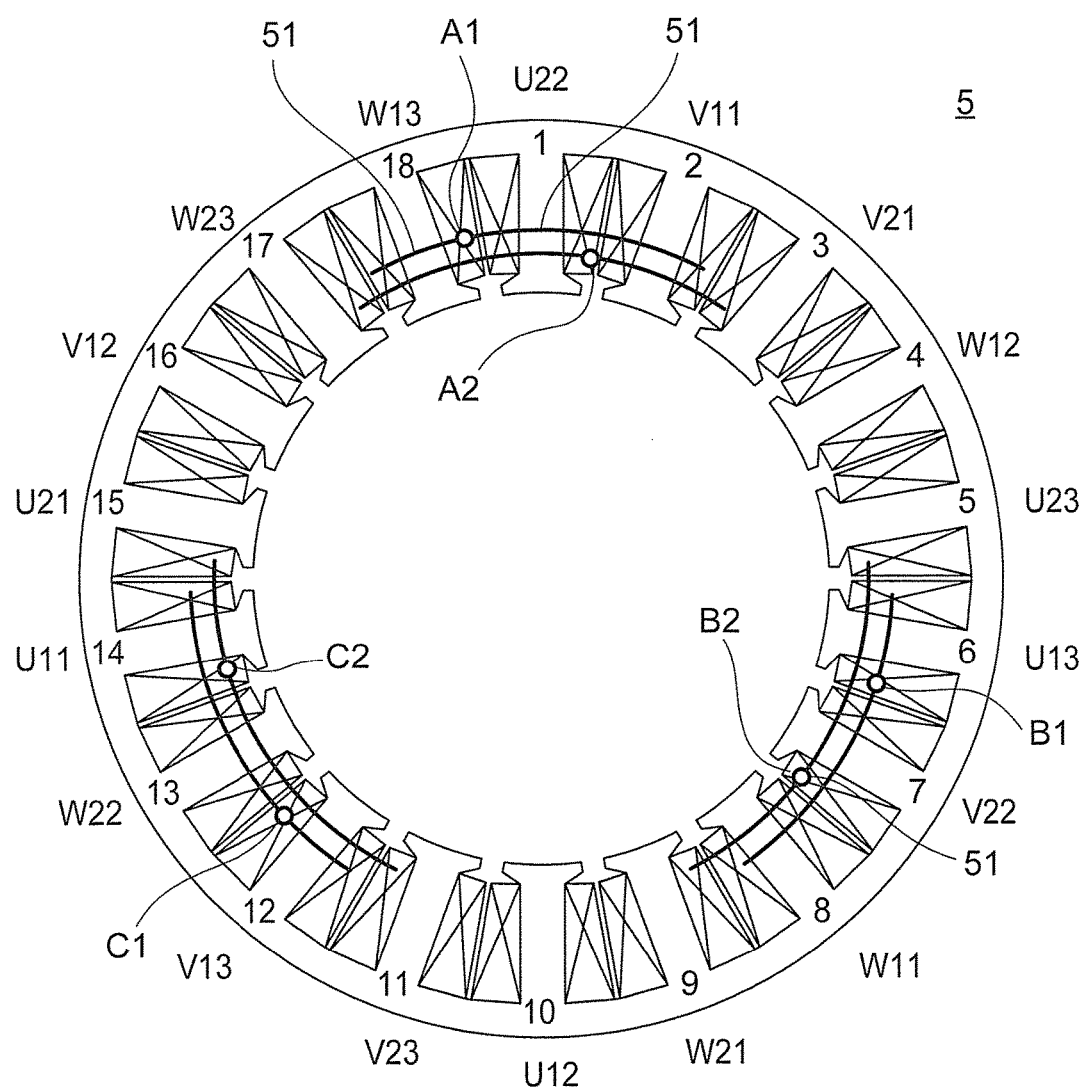
FIG. 20 is a frontal cross section that shows the electric motor according to Embodiment 6 of the present invention.
Figure 21:
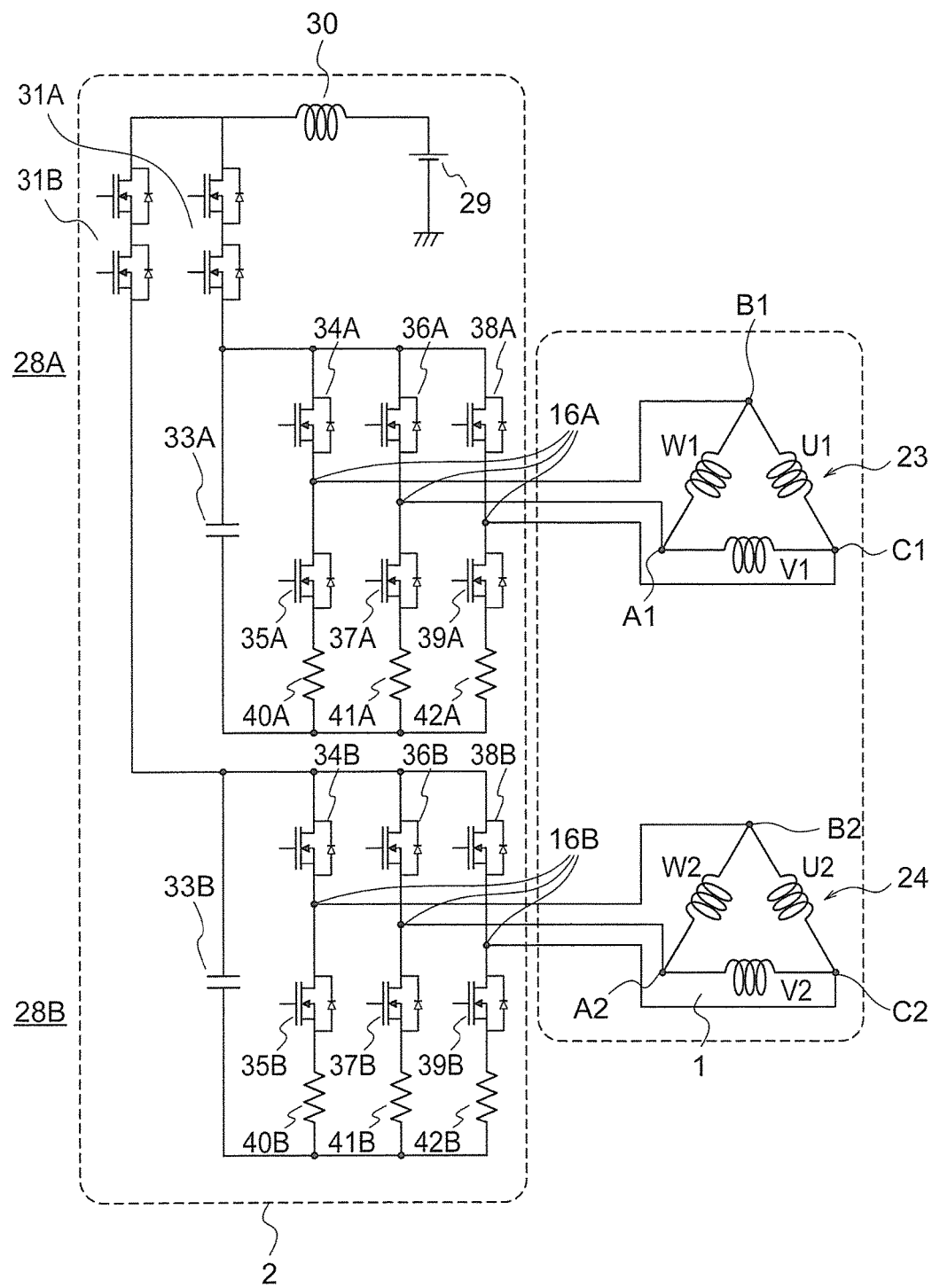
FIG. 21 is a circuit explaining diagram for the electric motor and an ECU according to Embodiment 6 of the present invention.

FIG. 19 is a connection explaining diagram for an armature winding 4 of an electric motor 1 according to Embodiment 6 of the present invention, FIG. 20 is a frontal cross section that shows the electric motor 1 according to Embodiment 6 of the present invention, and FIG. 21 is an explanatory diagram that explains a circuit for the electric motor 1 and an ECU 2 according to Embodiment 6.

As can be seen from the connection explaining diagram for the armature winding 4 according to Embodiment 1 that is shown in FIG. 7, the configuration of the electric motor 1 of Embodiment 6 is identical to that of Embodiment 1 except that respective lead wires 51 that are led out are subject to different connection.

In this embodiment, the lead wires 51 are respectively led out from coil portions U11 and U21, coil portions U13 and U23, coil portions V11 and V21, coil portions V13 and V23, coil portions W11 and W21, and coil portions W13 and W23, which are pairs of circumferentially adjacent identical-phase coils in each of the phases, and a delta-connection connecting portion C1 is formed by connecting the coil portions U11 and V13.

Similarly, a delta-connection connecting portion C2 is formed by connecting the coil portions U21 and V23. A delta-connection connecting portion B1 is formed by connecting the coil portions W11 and U13. A delta-connection connecting portion B2 is formed by connecting the coil portions W21 and U23. A delta-connection connecting portion A1 is formed by connecting the coil portions V11 and W13. A delta-connection connecting portion A2 is formed by connecting the coil portions V21 and W23.

As can be seen from FIG. 20, the delta-connection connecting portion A1 is disposed on an outer circumferential side of the electric motor 1 compared to the delta-connection connecting portion A2. The delta-connection connecting portion B1 is also disposed on an outer circumferential side of the electric motor 1 compared to the delta-connection connecting portion B2. The delta-connection connecting portion C1 is also disposed on an outer circumferential side of the electric motor 1 compared to the delta-connection connecting portion C2.

By adopting a configuration of this kind, because there are no positions where the conducting wires cross at the electric power supplying portion end, the winding operation is facilitated, improving manufacturability. The stator axial length L is also shortened, enabling the electric motor 1 to be reduced in size and weight.

Moreover, concerning the arrangement of the delta-connection connecting portion A1, the delta-connection connecting portion A2, the delta-connection connecting portion B1, the delta-connection connecting portion B2, the delta-connection connecting portion C1, and the delta-connection connecting portion C2, it goes without saying that similar or identical effects can also be achieved if the delta-connection connecting portion A1 is disposed on an inner circumferential side of the electric motor 1 compared to the delta-connection connecting portions A2, the delta-connection connecting portion B1 is disposed on an inner circumferential side of the electric motor 1 compared to the delta-connection connecting portion B2, and the delta-connection connecting portion C1 is disposed on an inner circumferential side of the electric motor 1 compared to the delta-connection connecting portion C2.

In FIG. 21, the armature winding 4 of the electric motor 1 is constituted by: a first armature winding portion 23 that is constituted by a first U-phase winding portion U1, a first V-phase winding portion V1, and a first W-phase winding portion W1, and a second armature winding portion 24 that is constituted by a second U-phase winding portion U2, a second V-phase winding portion V2, and a second W-phase winding portion W2.

The ECU 2 is constituted by two (first and second) inverters 28A and 28B, and three-phase electric current is supplied to the two armature winding portions 23 and 24 respectively from these inverters 28A and 28B. A direct-current power source is supplied to the ECU 2 from a power source 29 such as a battery, which is connected to electric power supply relays 31A and 31B so as to have a noise reduction coil 30 interposed. In FIG. 21, the power source 29 is depicted as if it were inside the ECU 2, but in fact electric power is supplied from an external power source such as a battery through a connector.

The two electric power supply relays 31A and 31B are each constituted by two MOSFETs, and the electric power supply relays 31A and 31B open during failure, to prevent excessive electric current from flowing.

Moreover, in the figure, the electric power supply relays 31A and 31B are connected sequentially with the power supply 29 and the coil 30, but it goes without saying that the electric power supply relays 31A and 31B may be disposed at a position that is closer to the power supply 29 than the coil 30.

Capacitors 33A and 33B are smoothing capacitors.

In FIG. 21, these are each constituted by a single capacitor 33A and 33B, but it goes without saying that they may be configured by connecting a plurality of capacitors in parallel.

Each of these inverters 28A and 28B is constituted by a respective bridge that uses six MOSFETs.

In the first inverter 28A, a first MOSFET 34A and a second MOSFET 35A are connected in series, a third MOSFET 36A and a fourth MOSFET 37A are connected in series, and a fifth MOSFET 38A and a sixth MOSFET 39A are connected in series. In addition, these three sets of MOSFETs that are connected in series are connected in parallel. In addition, a first shunt 40A, a second shunt 41A, and a third shunt 42A are respectively connected to a ground (GND) side of each of the three lower MOSFETs, i.e., the second MOSFET 35A, the fourth MOSFET 37A, and the sixth MOSFET 39A. These shunts 40A, 41A, and 42A are used to detect electric current value. Moreover, an example is shown in which there are three shunts 40A, 41A, and 42A, but since electric current detection is possible even if there are two shunts, or even if there is a single shunt, it goes without saying that such configurations are also possible.

Supply of electric current to the electric motor 1, as shown in FIG. 21, is respectively supplied from between the first MOSFET 34A and the second MOSFET 35A through an electric power supplying portion 16 to a first U-phase winding portion U1 of the electric motor 1, from between the third MOSFET 36A and the fourth MOSFET 37A through an electric power supplying portion 16 to a first V-phase winding portion V1 of the electric motor 1, and from between the fifth MOSFET 38A and the sixth MOSFET 39A through an electric power supplying portion 16 to a first W-phase winding portion W1 of the electric motor 1.

The second inverter 28B also has a similar configuration, and in the inverter 28B, a first MOSFET 34B and a second MOSFET 35B are connected in series, a third MOSFET 36B and a fourth MOSFET 37B are connected in series, and a fifth MOSFET 38B and a sixth MOSFET 39B are connected in series. In addition, these three sets of MOSFETs that are connected in series are connected in parallel. In addition, a first shunt 40B, a second shunt 41B, and a third shunt 42B are respectively connected to a ground (GND) side of each of the three lower MOSFETs, i.e., the second MOSFET 35B, the fourth MOSFET 37B, and the sixth MOSFET 39B. These shunts 40B, 41B, and 42B are used to detect electric current value. Moreover, an example is shown in which there are three shunts 40B, 41B, and 42B, but since electric current detection is possible even if there are two shunts, or even if there is a single shunt, it goes without saying that such configurations are also possible.

Supply of electric current to the electric motor 1, as shown in FIG. 21, is respectively supplied from between the first MOSFET 34B and the second MOSFET 35B through an electric power supplying portion 16 to a second U-phase winding portion U2 of the electric motor 1, from between the third MOSFET 36B and the fourth MOSFET 37B through an electric power supplying portion 16 to a second V-phase winding portion V2 of the electric motor 1, and from between the fifth MOSFET 38B and the sixth MOSFET 39B through an electric power supplying portion 16 to a second W-phase winding portion W2 of the electric motor 1.

The two inverters 28A and 28B are switched by sending signals from the controlling circuit (not shown) to each of the above MOSFETs in response to the angle of rotation that is detected by a rotational angle sensor 120 such as a magnetoresistive (MR) sensor, etc., that is included in the electric motor 1, to supply the desired three-phase electric currents to the first armature winding portion 23 and the second armature winding portion 24.

The delta-connection connecting portion A1, the delta-connection connecting portion B1, and the delta-connection connecting portion C1 that are shown in FIGS. 19 and 20 are connected to the first inverter 28A that is shown in FIG. 21. The delta-connection connecting portion A2, the delta-connection connecting portion B2, and the delta-connection connecting portion C2 that are shown in FIGS. 19 and 20 are connected to the second inverter 28B that is shown in FIG. 21.

Moreover, in this case, the electric power supplying portions 16 and the delta-connection connecting portions A1, B1, C1, A2, B2, and C2 are separate members, but the electric power supplying portions 16 may also serve as the delta-connection connecting portions.

According to the electric motor 1 according to Embodiment 6, effects such as the following can be achieved.

First, in FIG. 21, because the two armature winding portions 23 and 24 are connected in parallel outside the electric motor 1, one effect is that the influence of short-circuiting can be reduced even if short-circuiting occurs inside the electric motor 1, because torque can be generated in the unaffected inverters 28A and 28B and armature winding portions 23 and 24 provided that the circuits are electrically independent.

When the electric motor 1 is driven using only a single inverter 28, one problem is that the arrangement of the armature winding 4 is unbalanced, increasing vibration and noise in the electric motor 1.

In answer to that, according to the electric motor 1 according to Embodiment 5, because the coil portions that are components of the first armature winding portion 23 and the coil portions that are the components of the second armature winding portion 24 are disposed on each of the teeth 21 alternately circumferentially around the stator core 3, and electric current is passed separately from the respective inverters 28A and 28B through the first armature winding portion 23 and the second armature winding portion 24 in which the coil portions are disposed in this manner, vibration and noise are reduced in the electric motor 1 in a similar or identical manner to that of the electric motor 1 according to Embodiment 1.

When the electric motor 1 is driven by two inverters 28A and 28B, one problem is that vibration and noise increase in the electric motor 1 if imbalances occur between the electric currents and voltages of the two inverters 28A and 28B.

In answer to that, according to the electric motor 1 according to Embodiment 5, vibration and noise are reduced since the respective coil portions of the first armature winding portion 23 and the second armature winding portion 24 are disposed so as to have 180-degree symmetry from each other in a similar or identical manner to that of the electric motor 1 according to Embodiment 1.

Moreover, in FIG. 21, an example that does not have a motor relay is shown, but by disposing a motor relay, measures can be taken to reduce braking torque during a failure by opening the motor relay.

In the electric motor 1 according to Embodiment 6, the winding direction of the conducting wire in the intermediate coil portion of the three coil portions in each of the U-phase, V-phase, and W-phase identical-phase winding portions is different than the winding directions of the conducting wires in the other two coil portions, in a similar or identical manner to that of the electric motor 1 according to Embodiment 1, but by making the winding directions of the conducting wires of all three coil portions of each of the U-phase, V-phase, and W-phase identical-phase winding portions identical, and disposing the respective adjacent identical-phase coil portions in the same series circuit on the fifth teeth 21 so as to skip four teeth 21 from each other, in a similar or identical manner to that of the electric motor 1 according to Embodiment 5, one effect is that vibration noise that arises as a result of various irregularities can be reduced in a similar or identical manner to that of the electric motor 1 according to Embodiment 5. Even if the two inverters 28A and 28B were to fail, one effect is that unbalanced electromagnetic forces are reduced, enabling vibration to be reduced.

Embodiment 7

Figure 22:
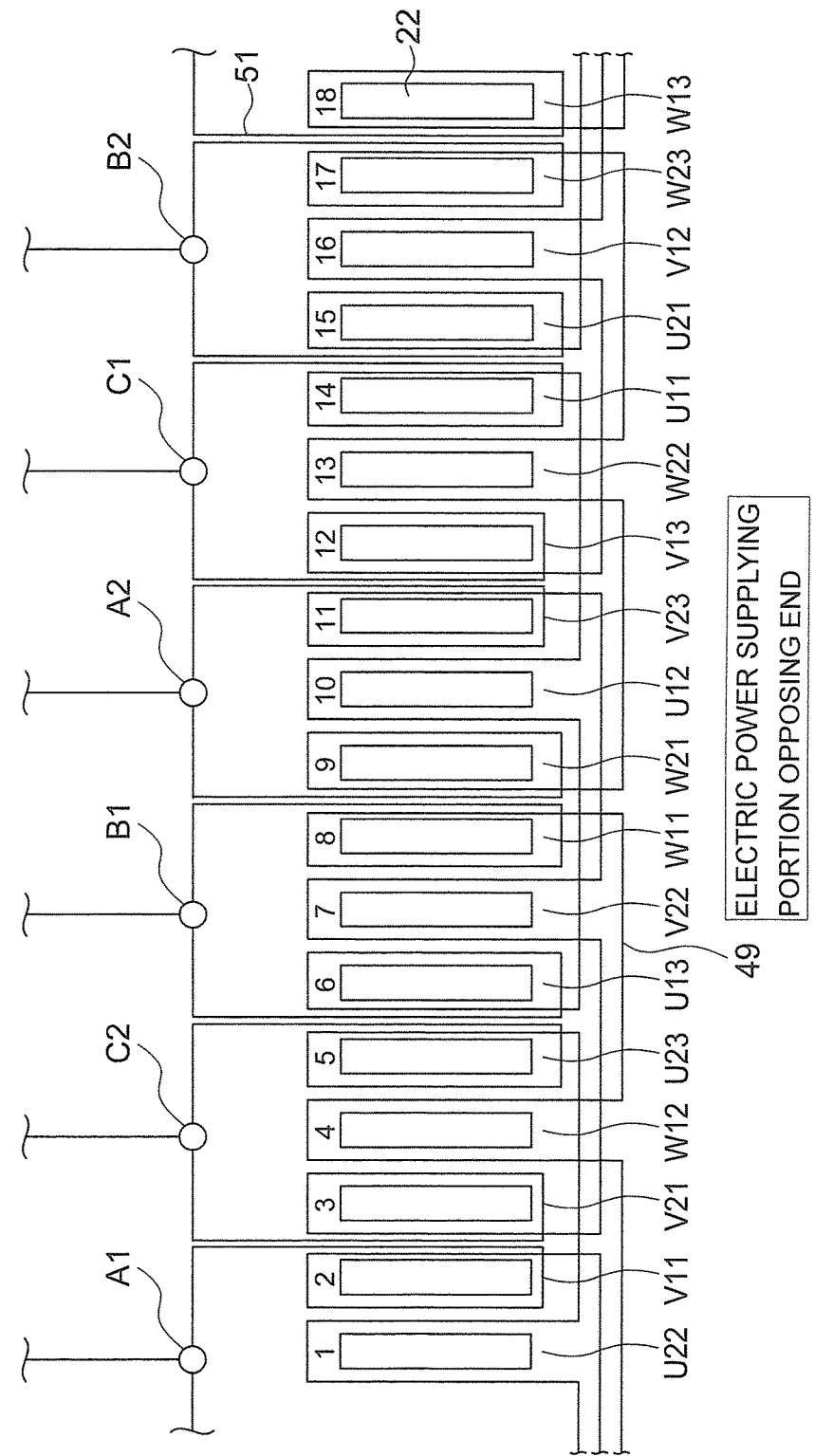
FIG. 22 is a connection explaining diagram for an armature winding of an electric motor according to Embodiment 7 of the present invention.
Figure 23:
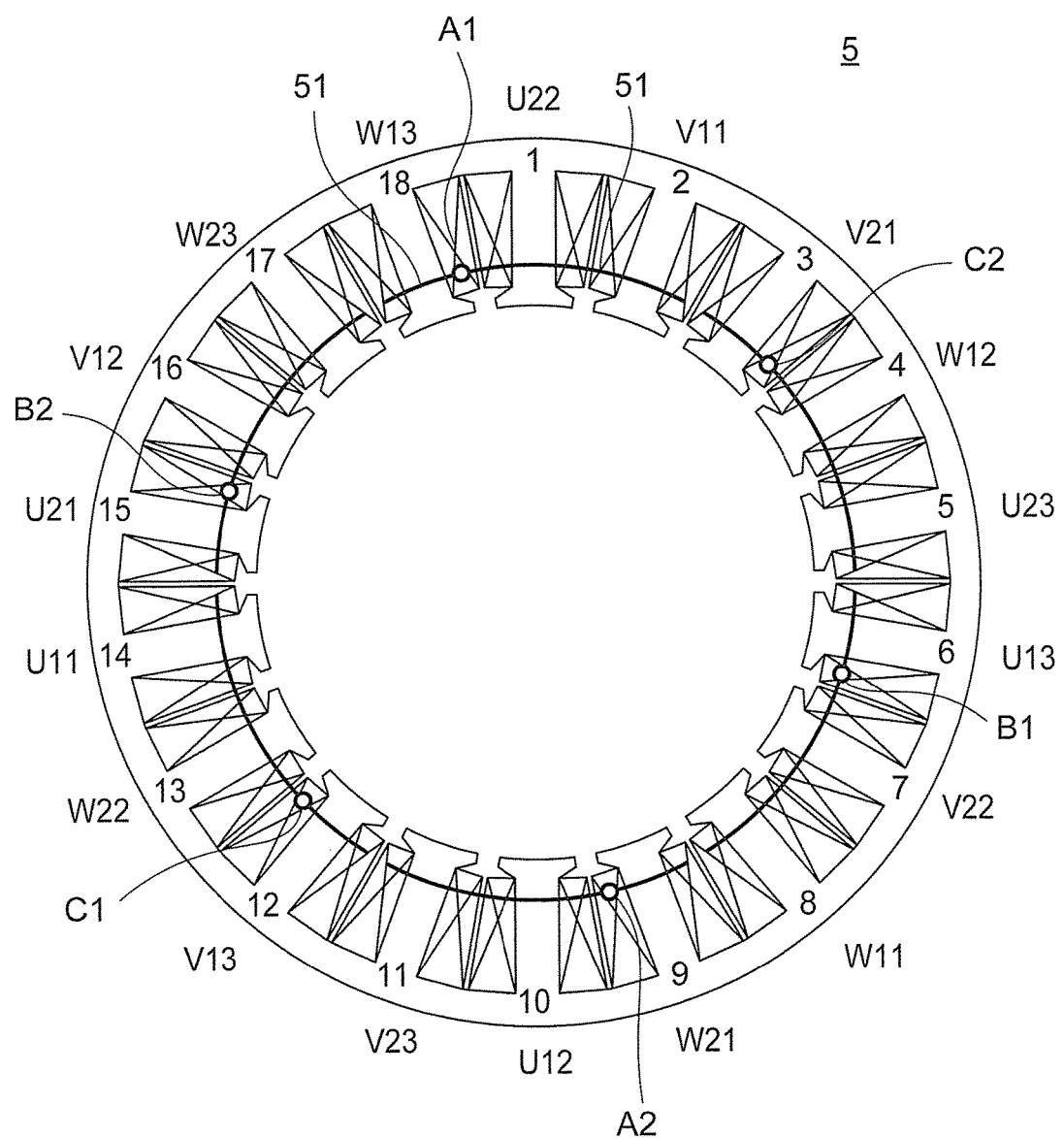
FIG. 23 is a frontal cross section that shows the electric motor according to Embodiment 7 of the present invention.

FIG. 22 is a connection explaining diagram for an armature winding 4 of an electric motor 1 according to Embodiment 7 of the present invention, and FIG. 23 is a frontal cross section of the electric motor 1.

As can be seen from the connection explaining diagram for the armature winding 4 according to Embodiment 1 that is shown in FIG. 7, the configuration of the electric motor 1 of Embodiment 7 is identical to that of Embodiment 1 except that respective lead wires 51 that are led out are subject to different connection.

In this electric motor 1, the lead wires 51 are respectively led out from coil portions U11 and U21, coil portions U13 and U23, coil portions V11 and V21, coil portions V13 and V23, coil portions W11 and W21, and coil portions W13 and W23, which are pairs of circumferentially adjacent identical-phase coils in each of the phases, and a delta-connection connecting portion C1 is formed by connecting the coil portions U11 and V13. Similarly, a delta-connection connecting portion B2 is formed by connecting U21 and W23. A delta-connection connecting portion B1 is formed by connecting W11 and U13. A delta-connection connecting portion A2 is formed by connecting W21 and V23. A delta-connection connecting portion A1 is formed by connecting V11 and W13. A delta-connection connecting portion C2 is formed by connecting V21 and U23.

The delta-connection connecting portion A1, the delta-connection connecting portion B1, and the delta-connection connecting portion C1 that are shown in these figures are connected to the first inverter 28A that is shown in FIG. 21. Similarly, the delta-connection connecting portion A2, the delta-connection connecting portion B2, and the delta-connection connecting portion C2 that are shown in these figures are connected to the second inverter 28B that is shown in FIG. 21.

According to the electric motor 1 according to Embodiment 7, because the configuration is such that only a single conducting wire is disposed on each of the teeth 21 at the electric power supplying portion end, as can be seen from FIG. 23, the winding operation is facilitated, improving manufacturability.

Effects can be achieved such as the stator axial length L being shortened, enabling the electric motor 1 to be reduced in size and weight.

Moreover, in the electric motor 1 according to Embodiment 7, the winding direction of the conducting wire in the intermediate coil portion of the three coil portions in each of the U-phase, V-phase, and W-phase identical-phase winding portions is different than the winding directions of the conducting wires in the other two coil portions, in a similar or identical manner to that of the electric motor 1 according to Embodiment 1, but by making the winding directions of the conducting wires of all three coil portions of each of the U-phase, V-phase, and W-phase identical-phase winding portions identical, and disposing the respective adjacent identical-phase coil portions in the same series circuit on the fifth teeth 21 so as to skip four teeth 21 from each other, in a similar or identical manner to that of the electric motor 1 according to Embodiment 5, one effect is that vibration noise that arises as a result of various irregularities can be reduced in a similar or identical manner to that of the electric motor 1 according to Embodiment 5. Even if the two inverters 28A and 28B were to fail, one effect is that unbalanced electromagnetic forces are reduced, enabling vibration to be reduced.

Embodiment 8

Figure 24:
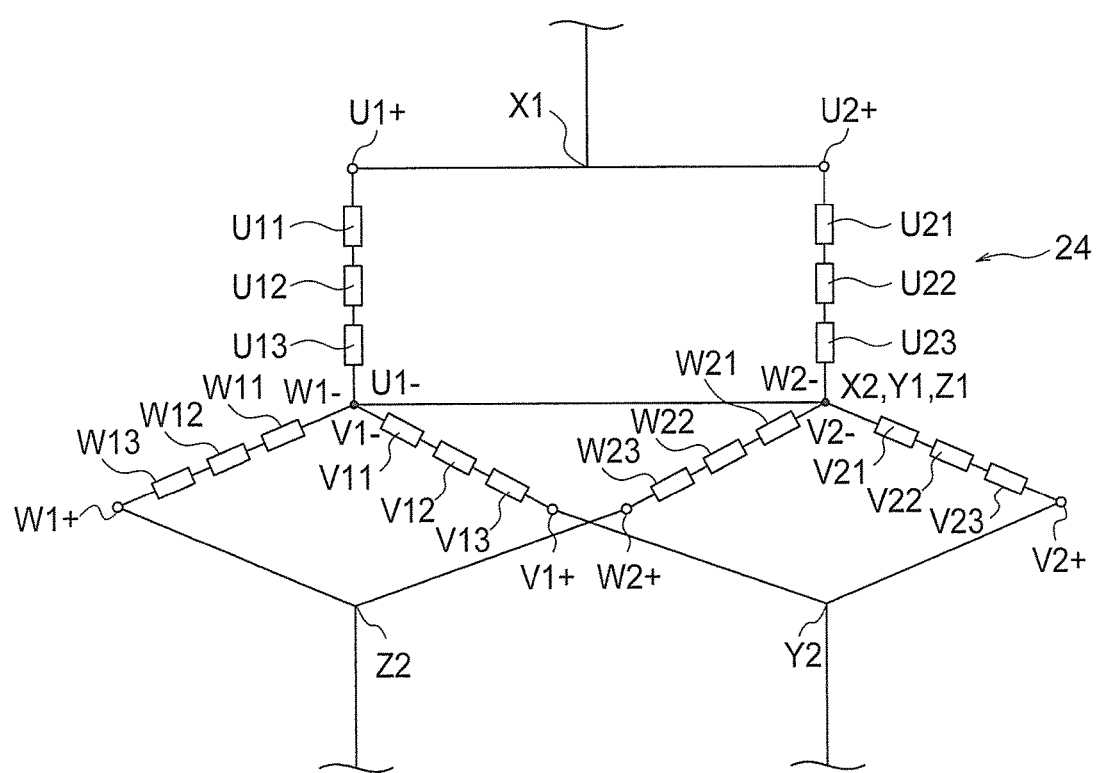
FIG. 24 is a circuit diagram that shows an armature winding of an electric motor according to Embodiment 8 of the present invention.
Figure 25:
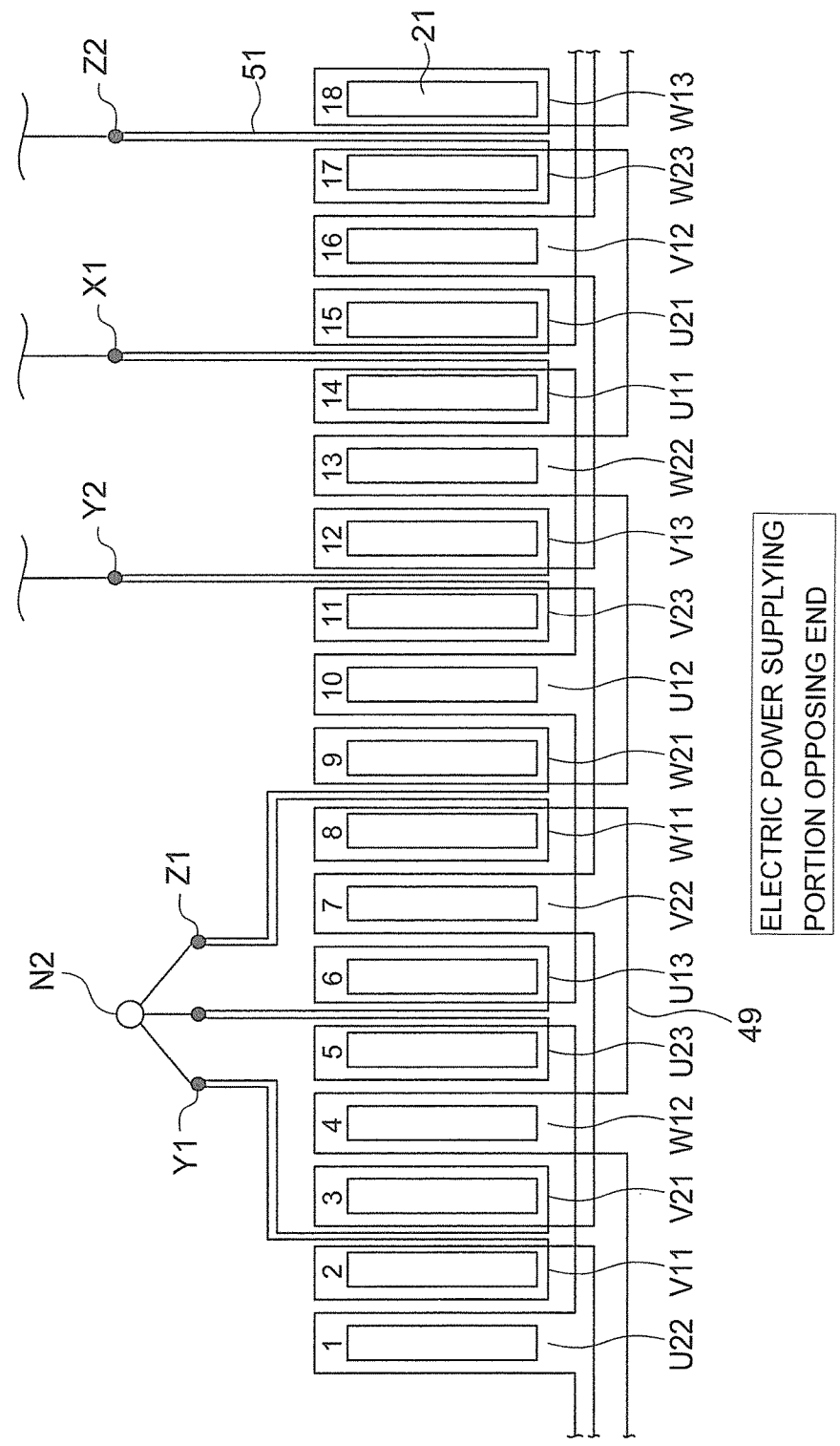
FIG. 25 is a connection explaining diagram for the armature winding of the electric motor according to Embodiment 8 of the present invention.

FIG. 24 is a winding circuit diagram for an electric motor 1 according to Embodiment 8 of the present invention, and FIG. 25 is a connection explaining diagram for an armature winding 4 of the electric motor 1.

As can be seen from the connection explaining diagram for the armature winding 4 according to Embodiment 1 that is shown in FIG. 7, the configuration of the electric motor 1 of Embodiment 8 is identical to that of Embodiment 1 except that respective lead wires 51 that are led out are subject to different connection.

In Embodiment 8, a left side in FIG. 24 is formed into a wye connection by connecting U1-, V1-, and W1-electrically to form a neutral point N1. A right side, on the other hand, is formed into a neutral point N2 by connecting U2-, V2-, and W2-electrically.

A neutral point is also formed by connecting a parallel circuit connecting portion X2, a parallel circuit connecting portion Y1, and a parallel circuit connecting portion Z1, which are three adjacent different-phase connecting portions. The circuit is driven by supplying electric power from an external three-phase alternating current electric power supply to a parallel circuit connecting portion X1, a parallel circuit connecting portion Y2, and a parallel circuit connecting portion Z2, which are another three adjacent different-phase connecting portions.

By adopting a configuration of this kind, crossover wires 49 are required for connecting the neutral points, but there is not even one position where conducting wires cross each other at the electric power supplying portion end, facilitating winding operations, and improving workability.

Stator axial length L of the electric motor 1 is shortened, enabling a small, light electric motor 1 to be obtained.

In addition, if the number of turns of the conducting wires in U12 and U22, coil portions V12 and V22, and coil portions W12 and W22, which are coil portions that have no lead wires 51 among the coil portions that constitute each of the series circuits, is made T, where T is a natural number, then since the number of turns of the conducting wires in U11, U13, U21, U23, V11, V13, V21, V23, W11, W13, W21, and W13, which are coil portions that have lead wires 51 among the coil portions that constitute each of the series circuits, becomes T±0.5 turns, where n is a natural number, effects can be achieved such as improving space factor and enabling torque to be improved compared to when the number of turns in all of the coil portions is an integer.

Moreover, in the electric motor 1 according to Embodiment 8, the winding direction of the conducting wire in the intermediate coil portion of the three coil portions in each of the U-phase, V-phase, and W-phase identical-phase winding portions is different than the winding directions of the conducting wires in the other two coil portions, in a similar or identical manner to that of the electric motor 1 according to Embodiment 1, but similar or identical effects can also be achieved by making the winding directions of the conducting wires of all three coil portions of each of the U-phase, V-phase, and W-phase identical-phase winding portions identical, and disposing the respective adjacent identical-phase coil portions in the same series circuit on the fifth teeth 21 so as to skip four teeth 21 from each other, in a similar or identical manner to that of the electric motor 1 according to Embodiment 5.

Embodiment 9

Figure 26:
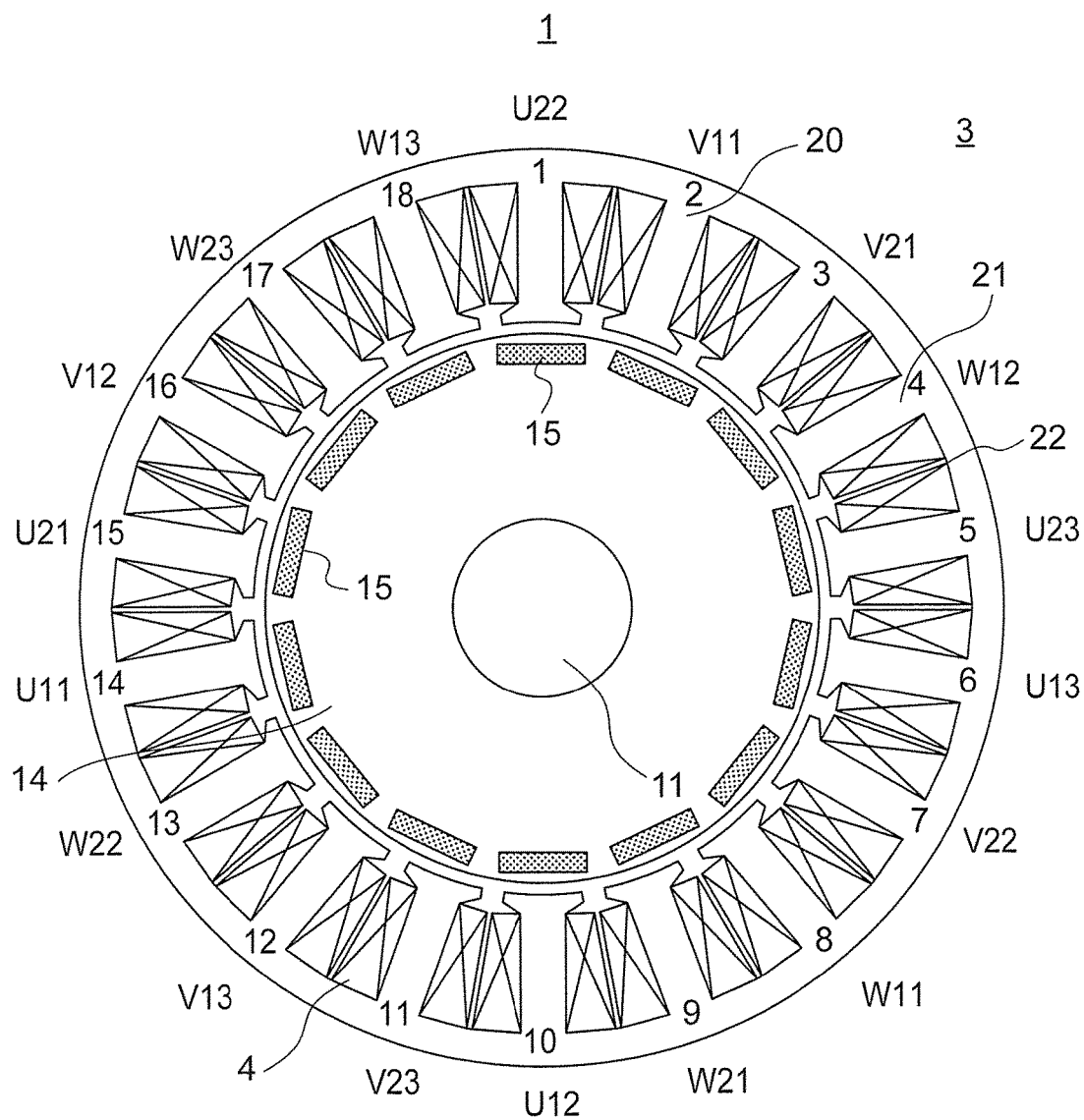
FIG. 26 is a frontal cross section that shows a permanent-magnet concentrated-winding electric motor according to Embodiment 9 of the present invention.

FIG. 26 is a frontal cross section that shows an electric motor 1 according to Embodiment 9 of the present invention.

In the electric motor according to Embodiment 9, a rotor 13 includes: a shaft 11; a rotor core 14 that is disposed outside the shaft 11; and fourteen permanent magnets 15 that have quadrangular cross-sectional shapes, the permanent magnets being embedded in the rotor core 14 at a uniform spacing in a circumferential direction.

Generally, in an embedded magnet electric motor 1 of this kind, the equivalent air gap is reduced compared to the surface magnet type that is shown in FIG. 3, enabling torque to be improved.

Configuration of a stator 5 is similar or identical to that of the electric motor 1 according to Embodiment 1, enabling the stator axial length L to be shortened. In other words, both increases in torque and reductions in size can be achieved.

In addition, since the cross-sectional shapes of the permanent magnets 15 are a quadrangular shape, machining costs for the permanent magnets 15 can be reduced, and since it is no longer necessary to cover each of the permanent magnets on the front surface using a cylindrical cover in order to prevent the permanent magnets from scattering, one effect is that the electric motor 1 can be reduced in cost.

Embodiment 10

Figure 27:
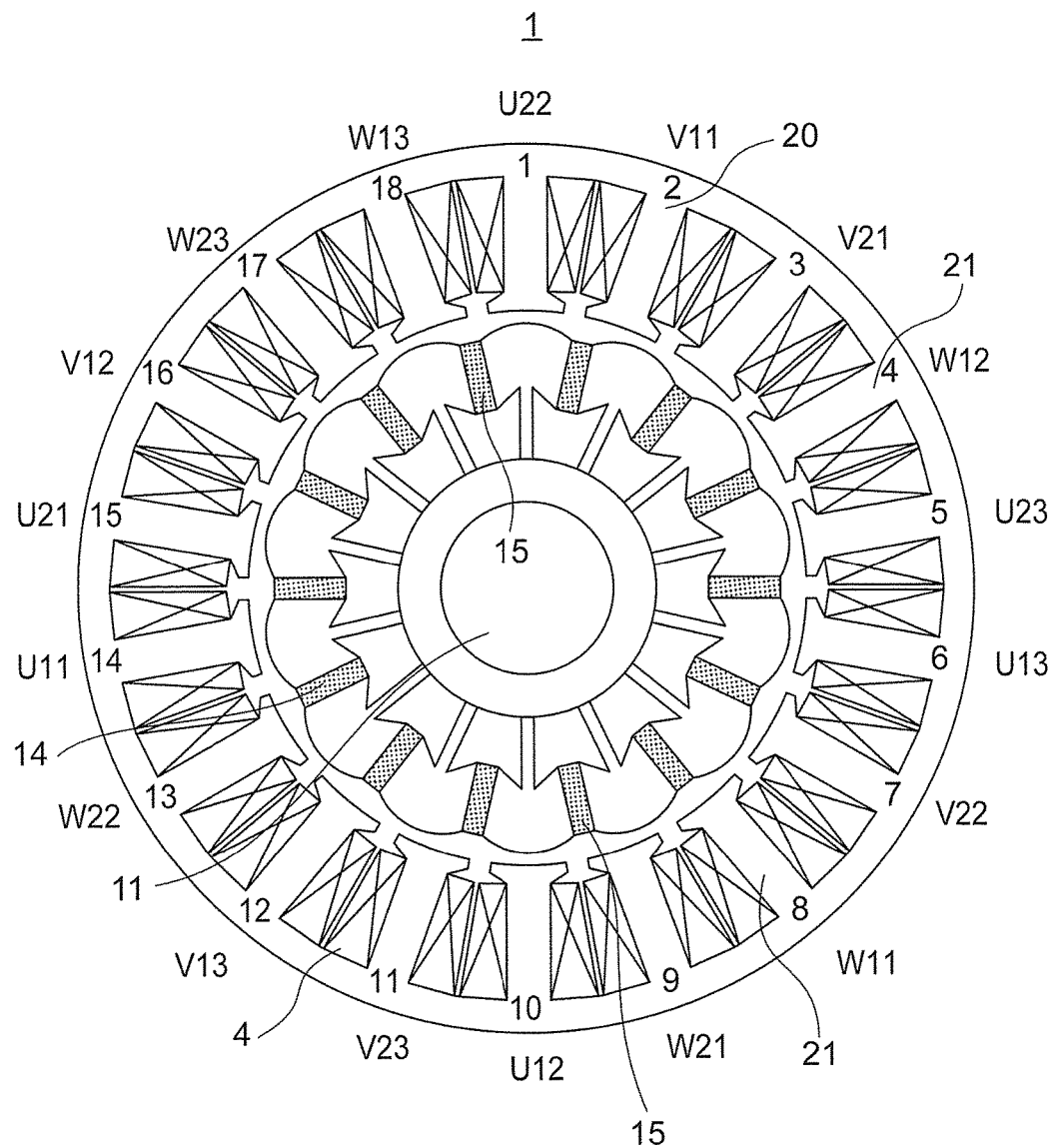
FIG. 27 is a frontal cross section that shows a permanent-magnet concentrated-winding electric motor according to Embodiment 10 of the present invention.

FIG. 27 is a frontal cross section that shows an electric motor 1 according to Embodiment 10 of the present invention.

In the electric motor according to Embodiment 10, a rotor 13 includes: a shaft 11; a rotor core 14 that is disposed outside the shaft 11; and fourteen permanent magnets 15 that have a length in a radial direction that is longer than a length in a circumferential direction, the permanent magnets being embedded in the rotor core 14 at a uniform spacing in a circumferential direction.

In the case of this embodiment, facing surfaces of adjacent permanent magnets 15 are magnetized so as to be mutually identical poles.

By adopting such directions of magnetization, magnetic flux is concentrated into the rotor core 14, and one effect is that magnetic flux density is increased. The rotor core 14 is interposed between the adjacent permanent magnets 15. Surfaces of this rotor core 14 that face toward the stator 5 have curved surface portions, the shapes of the curved surfaces thereof being formed into convex curved surfaces such that an air gap length to the stator 5 is shortest at a halfway point between the adjacent permanent magnets 15.

Because the waveform of the magnetic flux density that is generated in the air gap can be smoothed by such a shape, cogging torque and torque ripples can be reduced.

In addition, nonmagnetic portions are disposed so as to contact end surfaces on radially inner sides of the permanent magnets 15.

These may be air, or may be filled with a resin, or a nonmagnetic metal such as a stainless alloy or aluminum may be inserted.

By configuring in this manner, magnetic leakage flux from the permanent magnets 15 can be reduced.

Linking portions are disposed between the rotor core 14 between the adjacent permanent magnets 15 and the rotor core 14 that is disposed so as to surround the outer circumference of the shaft 11. These have a function of linking the two mechanically.

Since a length of the permanent magnets 15 in a radial direction is longer than a length in a circumferential direction, magnetic flux can be concentrated into the rotor core 14, increasing torque.

A stator 5 is similar or identical to the stator 5 according to Embodiment 1, enabling the stator axial length L to be shortened. In other words, both increases in torque and reductions in size can be achieved.

Moreover, in each of the above embodiments, an electric motor that has a three-phase armature winding as a rotary electric machine has been explained, but this is one example, and the electric motor may have a multiphase armature winding other than a three-phase one.

An electric motor that is mounted to an electric power steering apparatus is one example, and it may be an electric motor that is used for machining, conveyance, etc.

The present invention can also be applied to generators.

EXPLANATION OF NUMBERING

1 ELECTRIC MOTOR (ROTARY ELECTRIC MACHINE); 2 ELECTRONIC CONTROL UNIT (ECU); 3 STATOR CORE; 4 ARMATURE WINDING; 5 STATOR; 6 FRAME; 7 HOUSING; 8 BOLT; 9 FIRST BEARING; 10

SECOND BEARING; 11 SHAFT; 12 WALL PORTION; 13 ROTOR; 14 ROTOR CORE; 15 PERMANENT MAGNET; 16 ELECTRIC POWER SUPPLYING PORTION; 20 CORE BACK; 21 TOOTH; 22 SLOT; 23 FIRST ARMATURE WINDING PORTION; 24 SECOND ARMATURE WINDING PORTION; 28 INVERTER; 28A FIRST INVERTER; 28B SECOND INVERTER; 29 ELECTRIC POWER SUPPLY; 30 COIL; 31, 31A, 31B ELECTRIC POWER SUPPLY RELAY; 33, 33A, 33B CAPACITOR; 34, 34A, 34B FIRST MOSFET; 35, 35A, 35B SECOND MOSFET; 36, 36A, 36B THIRD MOSFET; 37, 37A, 37B FOURTH MOSFET; 38, 38A, 38B FIFTH MOSFET; 39, 39A, 39B SIXTH MOSFET; 40 FIRST SHUNT; 41 SECOND SHUNT; 42 THIRD SHUNT; 49 CROSSOVER WIRE; 50 COIL END; 51 LEAD WIRE; 100 ELECTRIC POWER SUPPLY DRIVING APPARATUS; 101 SHAFT; 102 TORQUE SENSOR; 103 FIRST CONNECTOR; 105 SECOND CONNECTOR; 106 ELECTRIC POWER SUPPLY CONNECTOR; 107 GEAR BOX; 108 HOUSING; 109 TIE ROD; 120 ROTATIONAL ANGLE SENSOR; 121 SENSOR PERMANENT MAGNET; 122 CONTROLLING CIRCUIT BOARD; A, B, C DELTA-CONNECTION CONNECTING PORTION; X1, X2, Y1, Y2, Z1, Z2 PARALLEL CIRCUIT CONNECTING PORTION; X1, X2, X3, X4, Y1, Y2, Y3, Y4, Z1, Z2, Z3, Z4 PRIMARY PARALLEL CIRCUIT CONNECTING PORTIONS; P1, P2, Q1, Q2, R1, R2 SECONDARY PARALLEL CIRCUIT CONNECTING PORTION; U1 THROUGH U4 FIRST THROUGH FOURTH U-PHASE WINDING PORTIONS (IDENTICAL-PHASE WINDING PORTIONS); V1 THROUGH V4 FIRST THROUGH FOURTH V-PHASE WINDING PORTIONS (IDENTICAL-PHASE WINDING PORTIONS); W1 THROUGH W4 FIRST THROUGH FOURTH W-PHASE WINDING PORTIONS (IDENTICAL-PHASE WINDING PORTIONS); S1, S2 VACANT SPACE.

The invention claimed is:
1. A rotary electric machine comprising:
a rotor that comprises a plurality of magnetic poles; and
a stator that is disposed so as to surround the rotor, the stator comprising:
a stator core; and
an armature winding that is mounted to the stator core,
wherein:
the stator core comprises:
an annular core back; and
a plurality of teeth that extend from the core back in a radially inward direction of the rotor;
the armature winding is constituted by a plurality of identical-phase winding portions;
each of the identical-phase winding portions comprises a plurality of coil portions that have identical phase;
the plurality of coil portions are configured such that a conducting wire is wound in concentration onto each of the plurality of teeth;
a plurality of coil portions that have identical phase are connected in series by means of crossover wires in each of the identical-phase winding portions;
a plurality of lead wires are respectively led out from each of the identical-phase winding portions;
the coil portion from which the lead wire is led out in a first identical-phase winding portion among a mutually different pair of the identical-phase winding portions constitutes a first coil portion, and the coil portion from which the lead wire is led out in a second identical-phase winding portion constitutes a second coil portion;

a phase of the first coil portion is an identical phase to a phase of the second coil portion;
the first coil portion is disposed so as to be adjacent to the second coil portion in a circumferential direction of the stator core;
each of the lead wires of each of the identical-phase winding portions is led out in a first axial direction of the rotor;
all of the crossover wires of each of the identical-phase winding portions are led out in a second axial direction of the rotor;

$$M=(18\pm4)n; \text{ and}$$

$$N=18n,$$

where M is a number of poles in the rotor, N is a number of the teeth, and n is a natural number;
each of the identical-phase winding portions respectively comprises three of the coil portions; and
the three coil portions are respectively configured such that the conducting wire is wound continuously in an identical direction so as to skip three of the teeth and be wound onto a fourth of the teeth, or so as to skip four of the teeth and be wound onto a fifth of the teeth.
2. The rotary electric machine according to claim 1, wherein the armature winding is configured into a parallel circuit by connecting together respective lead wires of each of the identical-phase winding portions.
3. The rotary electric machine according to claim 1, wherein:
the rotary electric machine is an electric motor; and
each of the lead wires is connected to an electric power supplying portion that supplies electricity to the armature winding, the electric power supplying portion being disposed in the axial dimension of the rotor.
4. The rotary electric machine according to claim 3, wherein:
the armature winding comprises:
a first armature winding portion that comprises:
a first U-phase winding portion in which the coil portions comprise a plurality of U-phase coil portions;
a first V-phase winding portion in which the coil portions comprise a plurality of V-phase coil portions; and
a first W-phase winding portion in which the coil portions comprise a plurality of W-phase coil portions; and
a second armature winding portion that comprises:
a second U-phase winding portion in which the coil portions comprise a plurality of U-phase coil portions;
a second V-phase winding portion in which the coil portions comprise a plurality of V-phase coil portions; and
a second W-phase winding portion in which the coil portions comprise a plurality of W-phase coil portions;
the first armature winding portion is connected to a first inverter by means of the power supplying portion; and
the second armature winding portion is connected to a second inverter by means of the power supplying portion.
5. The rotary electric machine according to claim 4, wherein each of the lead wires is respectively connected to a lead wire that is led out from a different-phase coil portion.

6. The rotary electric machine according to claim 3, wherein the electric motor is mounted to an electric power steering apparatus.

7. A rotary electric machine comprising:
a rotor that comprises a plurality of magnetic poles; and
a stator that is disposed so as to surround the rotor, the stator comprising:
  a stator core; and
  an armature winding that is mounted to the stator core, wherein:
the stator core comprises:
  an annular core back; and
  a plurality of teeth that extend from the core back in a radially inward direction of the rotor;
the armature winding is constituted by a plurality of identical-phase winding portions;
each of the identical-phase winding portions comprises a plurality of coil portions that have identical phase;
the plurality of coil portions are configured such that a conducting wire is wound in concentration onto each of the plurality of teeth;
a plurality of coil portions that have identical phase are connected in series by means of crossover wires in each of the identical-phase winding portions;
a plurality of lead wires are respectively led out from each of the identical-phase winding portions;
the coil portion from which the lead wire is led out in a first identical-phase winding portion among a mutually different pair of the identical-phase winding portions constitutes a first coil portion, and the coil portion from which the lead wire is led out in a second identical-phase winding portion constitutes a second coil portion;
a phase of the first coil portion is an identical phase to a phase of the second coil portion;
the first coil portion is disposed so as to be adjacent to the second coil portion in a circumferential direction of the stator core;
each of the lead wires of each of the identical-phase winding portions is led out in a first axial direction of the rotor;
all of the crossover wires of each of the identical-phase winding portions are led out in a second axial direction of the rotor;

$M=(18\pm4)n$; and $N=18n$, where M is a number of poles in the rotor, N is a number of the teeth, and n is a natural number;
each of the identical-phase winding portions respectively comprises three of the coil portions; and
an intermediate coil portion among the three coil portions that are serially connected has a different number of turns of the conducting wire to two remaining coil portions.

8. The rotary electric machine according to claim 7, wherein an intermediate coil portion among three of the coil portions that are serially connected has a greater number of turns of the conducting wire than two remaining coil portions.

9. The rotary electric machine according to claim 7, wherein the armature winding is configured into a parallel circuit by connecting together respective lead wires of each of the identical-phase winding portions.

10. The rotary electric machine according to claim 7, wherein:
the rotary electric machine is an electric motor; and
each of the lead wires is connected to an electric power supplying portion that supplies electricity to the armature winding, the electric power supplying portion being disposed in the axial dimension of the rotor.

11. The rotary electric machine according to claim 10, wherein:
the armature winding comprises:
  a first armature winding portion that comprises:
    a first U-phase winding portion in which the coil portions comprise a plurality of U-phase coil portions;
    a first V-phase winding portion in which the coil portions comprise a plurality of V-phase coil portions; and
    a first W-phase winding portion in which the coil portions comprise a plurality of W-phase coil portions; and
  a second armature winding portion that comprises:
    a second U-phase winding portion in which the coil portions comprise a plurality of U-phase coil portions;
    a second V-phase winding portion in which the coil portions comprise a plurality of V-phase coil portions; and
    a second W-phase winding portion in which the coil portions comprise a plurality of W-phase coil portions;
the first armature winding portion is connected to a first inverter by means of the power supplying portion; and
the second armature winding portion is connected to a second inverter by means of the power supplying portion.

12. The rotary electric machine according to claim 11, wherein each of the lead wires is respectively connected to a lead wire that is led out from a different-phase coil portion.

13. The rotary electric machine according to claim 10, wherein the electric motor is mounted to an electric power steering apparatus.

* * * * *